United States Patent
Lee et al.

(10) Patent No.: US 12,481,552 B2
(45) Date of Patent: Nov. 25, 2025

(54) MEMORY CONTROLLER MANAGING READ LEVEL INFORMATION, MEMORY SYSTEM INCLUDING THE SAME, AND OPERATING METHOD OF THE MEMORY CONTROLLER

(71) Applicant: SAMSUNG ELECTRONICS CO., LTD., Suwon-si (KR)

(72) Inventors: Jeongwoo Lee, Suwon-si (KR); Kwangwoo Lee, Suwon-si (KR); Jeongkeun Park, Suwon-si (KR); Heejun Oh, Suwon-si (KR); Byungchan Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/753,410

(22) Filed: Jun. 25, 2024

(65) Prior Publication Data

US 2025/0165339 A1 May 22, 2025

(30) Foreign Application Priority Data

Nov. 21, 2023 (KR) .................... 10-2023-0162729

(51) Int. Cl.
*G06F 11/10* (2006.01)
(52) U.S. Cl.
CPC ...... *G06F 11/1016* (2013.01); *G06F 11/1068* (2013.01)
(58) Field of Classification Search
None
See application file for complete search history.

(56) References Cited

U.S. PATENT DOCUMENTS

| | | | |
|---|---|---|---|
| 9,236,147 B1 | 1/2016 | Bellorado et al. | |
| 9,715,939 B2 * | 7/2017 | Ellis | G11C 16/10 |
| 9,836,219 B2 * | 12/2017 | Kim | G06F 3/0653 |
| 9,852,804 B2 | 12/2017 | Park et al. | |
| 9,898,209 B2 | 2/2018 | Sankaranarayanan et al. | |
| 10,910,066 B2 * | 2/2021 | Shirakawa | G11C 16/0483 |
| 11,335,423 B2 | 5/2022 | Cha et al. | |

(Continued)

OTHER PUBLICATIONS

Y. Cai, S. Ghose, E. F. Haratsch, Y. Luo and O. Mutlu, "Error Characterization, Mitigation, and Recovery in Flash-Memory-Based Solid-State Drives," in Proceedings of the IEEE, vol. 105, No. 9, pp. 1666-1704, Sep. 2017, (Year: 2017).*

*Primary Examiner* — Daniel F. McMahon
(74) *Attorney, Agent, or Firm* — Sughrue Mion, PLLC

(57) ABSTRACT

An operating method of a memory controller is provided. The method includes: in a first super block including first blocks of memory chips, storing a first read level with respect to a first block in a first memory as first super block read level (RL) information; storing the first read level in a second memory as first chip RL information corresponding to the first memory chip; during the read operation on the first blocks included in the first super block, controlling the read operation based on the first super block RL information stored in the first memory; and based on a failure occurring in data read from the first block of the first memory chip by using the first super block RL information, controlling the read operation on the first block of the first memory chip based on the first chip RL information stored in the second memory.

20 Claims, 19 Drawing Sheets

(56) References Cited

U.S. PATENT DOCUMENTS

| | | |
|---|---|---|
| 11,561,870 B2 | 1/2023 | Jain |
| 2017/0300252 A1* | 10/2017 | Yim ...................... G06F 3/0688 |
| 2019/0130967 A1* | 5/2019 | Danjean .............. G11C 11/5642 |
| 2019/0179563 A1 | 6/2019 | Lee et al. |
| 2020/0371908 A1* | 11/2020 | Cariello .................. G06F 3/064 |
| 2021/0166774 A1* | 6/2021 | Cha ...................... G11C 29/021 |
| 2021/0366562 A1* | 11/2021 | Oh .......................... G11C 16/16 |
| 2022/0068423 A1* | 3/2022 | Yang .................... G06F 11/1048 |
| 2022/0139466 A1* | 5/2022 | Gorobets ............ G11C 11/5628 |
| | | 365/189.011 |
| 2022/0262450 A1 | 8/2022 | Kim |

\* cited by examiner

FIG. 8B

|  | RP1 | RP2 | RP3 | RP4 | RP5 | RP6 | RP7 |
|---|---|---|---|---|---|---|---|
| Offset (x10mV) | -3 | -2 | -2 | -1 | -5 | 6 | 7 |

FIG. 16

| | Index | |
|---|---|---|
| Chip 1 | Val 1 | Val 2 | — Index 1
| | ⋮ | ⋮ |
| | Val 1 | Val 2 | — Index K
| Chip 2 | Val 1 | Val 2 | — Index 1
| | ⋮ | ⋮ |
| | Val 1 | Val 2 | — Index K
| ⋮ | ⋮ | ⋮ |

MEMORY CONTROLLER MANAGING READ LEVEL INFORMATION, MEMORY SYSTEM INCLUDING THE SAME, AND OPERATING METHOD OF THE MEMORY CONTROLLER

CROSS-REFERENCE TO RELATED APPLICATION

This application priority to Korean Patent Application No. 10-2023-0162729, filed on Nov. 21, 2023, in the Korean Intellectual Property Office, the disclosure of which is incorporated by reference herein in its entirety.

BACKGROUND

The present disclosure relates to a memory controller, and, more particularly to, a memory controller managing read level (RL) information, a memory system including the same, and an operating method of the memory controller.

As non-volatile memory, flash memory is able to retain data stored therein even when power is cut off. A memory system (or a storage device) including flash memory, such as a solid state drive (SSD), a memory card, etc., is widely used and is useful for storing a large amount of data.

When reading data from memory cells of the flash memory, a read voltage including one or more read levels may be used in a read operation to determine multiple threshold voltage distributions. When a failure occurs in the read data, an algorithm may be used to calculate the optimal read level between the threshold voltage distributions, and the read operation may be performed using a read voltage with a newly calculated read level.

When optimal RL information is stored and used with respect to read units of a memory cell array, the possibility of a read data failure may be reduced. However, as the capacity of the memory device increases, the size of expensive and high-speed memory that stores RL information may increase, which causes a cost increase.

SUMMARY

One or more embodiments provide a memory controller capable of managing read level (RL) information that may reduce the possibility of a data failure as well as minimizing an increase in resources for storing the RL information, a memory system including the same, and an operating method of the memory controller.

According to an aspect of an embodiment, an operating method of a memory controller, wherein the memory controller is configured to control a read operation of a memory device including a plurality of memory chips, the plurality of memory chips including a first memory chip, is provided. The operating method includes: in a first super block including first blocks of the plurality of memory chips, calculating a first read level with respect to a first block of the first memory chip; storing the first read level in a first memory as first super block read level (RL) information corresponding to the first super block; storing the first read level in a second memory as first chip RL information corresponding to the first memory chip; during the read operation on the first blocks included in the first super block, controlling the read operation based on the first super block RL information stored in the first memory; and based on a failure occurring in data read from the first block of the first memory chip by using the first super block RL information, controlling the read operation on the first block of the first memory chip based on the first chip RL information stored in the second memory.

According to another aspect of an embodiment, a memory controller for communicating with a memory device including a plurality of memory chips, the memory controller includes: a processor configured to control a read operation on the memory device; a read level (RL) information management circuit configured to, with respect to a first super block including first blocks of the plurality of memory chips, set a read level calculated with respect to at least one first block as first super block RL information corresponding to the first super block, and set a read level calculated with respect to the first blocks of the plurality of memory chips as chip RL information corresponding to the corresponding memory chip; a first memory configured to store a plurality of pieces of super block RL information respectively corresponding to a plurality of super blocks provided in the plurality of memory chips; and a second memory configured to store a plurality of chip RL information respectively corresponding to the plurality of memory chips. During a read operation on the memory device, the processor is further configured to control the read operation according to super block RL information read from the first memory, and, based on a failure occurring in data read based on the super block RL information, control the read operation according to chip RL information read from the second memory.

According to another aspect of an embodiment, a memory system includes: a memory device including a plurality of memory chips, each of the plurality of memory chips including a plurality of blocks, wherein first blocks of the plurality of memory chips constitute a first super block; and a memory controller configured to control a read operation on the memory device according to a request from a host. The memory device is configured to: read data of a first block of a first memory chip according to first super block read level (RL) information that is commonly set for the first blocks of the first super block and indicates a first read level; and based on a failure occurring in the data read based on the first super block RL information, read the data of the first block of the first memory chip according to first chip RL information that is set separately with respect to the first memory chip and indicates a second read level different from the first read level.

BRIEF DESCRIPTION OF DRAWINGS

The above and other aspects and features will be more apparent from the following description of embodiments, taken in conjunction with the accompanying drawings in which:

FIGS. 8A, 8B, and 9 are diagrams illustrating a memory device including multi-level cells;

FIGS. 15 and 16 are diagrams illustrating memory systems according to various embodiments;

DETAILED DESCRIPTION

Figure 1:
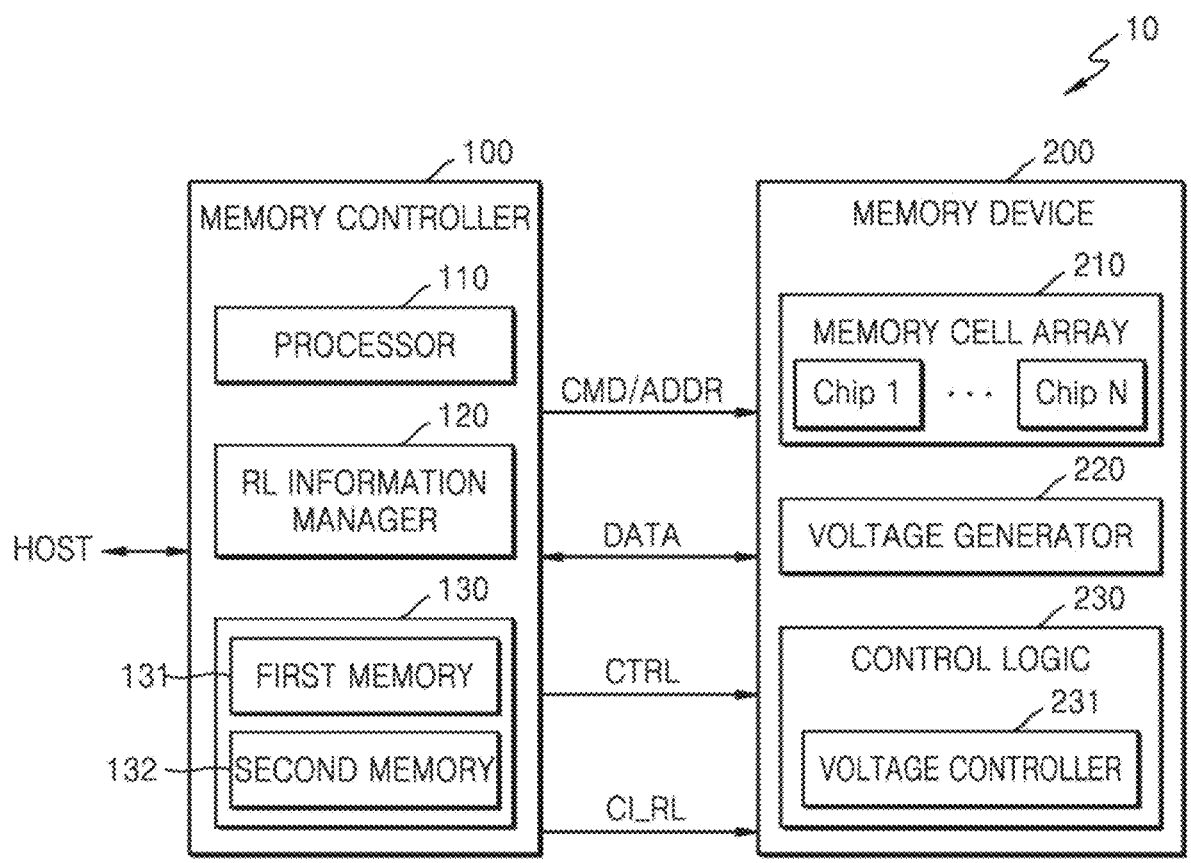
FIG. 1 is a block diagram illustrating a memory system according to an embodiment.

Hereinafter, some embodiments will be described in detail with reference to the attached drawings. Hereinafter, embodiments are described in detail with reference to the accompanying drawings. Like components are denoted by like reference numerals throughout the specification, and repeated descriptions thereof are omitted. It will be understood that when an element or layer is referred to as being "on," "connected to" or "coupled to" another element or layer, it can be directly on, connected or coupled to the other element or layer, or intervening elements or layers may be present. By contrast, when an element is referred to as being "directly on," "directly connected to" or "directly coupled to" another element or layer, there are no intervening elements or layers present. Embodiments described herein are example embodiments, and thus, the present disclosure is not limited thereto, and may be realized in various other forms. Each embodiment provided in the following description is not excluded from being associated with one or more features of another example or another embodiment also provided herein or not provided herein but consistent with the present disclosure.

FIG. 1 is a block diagram illustrating a memory system 10 according to an embodiment.

Referring to FIG. 1, the memory system 10 may include a memory controller 100 and a memory device 200. The memory device 200 may include a memory cell array 210, a voltage generator 220, and a control logic 230. In addition, the control logic 230 may include a voltage controller 231. In an example of FIG. 1, the voltage controller 231 is provided within the control logic 230, but the voltage controller 231 according to an embodiment may be implemented as a separate component outside the control logic 230.

For example, the memory system 10 may communicate with a host HOST through various interfaces, for example, universal serial bus (USB), multimedia card (MMC), embedded MMC (eMMC), peripheral component interconnection (PCI), PCI-express (PCI-E), Advanced Technology Attachment (ATA), Serial-ATA, Parallel-ATA, small computer small interface (SCSI), enhanced small disk interface (ESDI), Integrated Drive Electronics (IDE), Firewire, Universal Flash Storage (UFS), Nonvolatile Memory express (NVMe), etc.

According to an embodiment, the memory device 200 may include a non-volatile memory device. In some embodiments, the memory system 10 may be implemented as a memory embedded in or removable from an electronic device. For example, the memory system 10 may be implemented in various forms such as an embedded UFS memory device, an eMMC, a solid state drive (SSD), a UFS memory card, a compact flash (CF), secure digital (SD), Micro-SD, Mini-SD, extreme Digital (xD), a memory stick, etc. In addition, the memory system 10 may also be referred to as a storage device that stores data non-volatilely.

The memory controller 100 may control the memory device 200 to read data stored in the memory device 200 or write data to the memory device 200 in response to a write/read request from the host HOST. For example, the memory controller 100 may include a processor 110, and the processor 110 may control overall operations inside the memory controller 100, and also control a memory operation on the memory device 200. Specifically, the memory controller 100 provides an address ADDR, a command CMD, and a control signal CTRL to the memory device 200 by the control of the processor 110, thereby controlling write, read, erase operations on the memory device 200. In addition, data DATA to be stored in the memory device 200 and data DATA read from the memory device 200 may be transmitted and received between the memory controller 100 and the memory device 200.

The memory cell array 210 may include first to Nth memory chips Chip 1 to Chip N as a plurality of memory chips (e.g., NAND chips), each of the first to Nth memory chips Chip 1 to Chip N may include a plurality of blocks, and each block may include a plurality of memory cells. Each of the first to Nth memory chips Chip 1 to Chip N may further include a peripheral circuit that performs program/read and erase operations on the memory cells. In addition, in FIG. 1, the voltage generator 220 and the control logic 230 are disposed outside the first to Nth memory chips Chip 1 to Chip N, but at least some of elements constituting the voltage generator 220 and the control logic 230 may be provided in the first to Nth memory chips Chip 1 to Chip N. Hereinafter, some embodiments will be described in detail by using an example in which the memory cells are NAND flash memory cells. However, embodiments are not limited thereto, and in some embodiments, the memory cells may be resistive memory cells, such as resistive RAM (ReRAM), phase change RAM (PRAM), or magnetic RAM (MRAM).

In an embodiment, the memory cell array 210 may include a three-dimensional (3D) memory cell array, the 3D memory cell array may include a plurality of NAND strings, and each NAND string may include memory cells respectively connected to word lines stacked vertically on a substrate. However, embodiments are not limited thereto, and in some embodiments, the memory cell array 210 may include a two-dimensional (2D) memory cell array, and the 2D memory cell array may include a plurality of NAND strings disposed in row and column directions.

As a read command requesting read from the memory controller 100 is provided to the memory device 200, a read operation may be performed based on the control of the control logic 230. For example, when each memory cell stores a plurality of bits, the memory cells of the memory cell array 210 may be programmed with a plurality of threshold voltage distributions, and data including two or more bits may be read from each memory cell.

The voltage generator 220 may generate various voltages used within the memory device 200, and, for example, may generate a program voltage for a program operation and a read voltage for a read operation. In addition, the voltage generator 220 may adjust levels of various voltages based on the control of the control logic 230. For example, the voltage generator 220 may provide a read voltage at various levels to determine the plurality of threshold voltage distributions.

The control logic 230 may control the overall operation of the memory device 200, and may, for example, generate various internal control signals for programming data in the memory cell array 210 or reading data from the memory cell array 210, based on the command CMD, the address ADDR, and the control signal CTRL received from the memory controller 100. In addition, the control logic 230 may output a voltage control signal that adjusts levels of various voltages output from the voltage generator 220 in relation to the program operation, the read operation, and the erase operation.

As an operation example, when an error is detected in data read from the memory cell array 210 or an uncorrectable error occurs, the memory controller 100 may determine that a data failure has occurred and retry reading the memory cell array 210. For example, the memory controller 100 may execute an algorithm (e.g., recovery algorithm) for calculating an optimal read level (RL) for determining threshold voltage distributions based on the control of the processor 110, and control the memory device 200 so that data is re-read using a read voltage having the calculated optimal read level.

According to some embodiments, the memory controller 100 may include an RL information manager 120 and a memory 130. The memory 130 may include a first memory 131 that stores RL information in super block units (hereinafter referred to as super block RL information) and second memory 132 that stores RL information in chip units (hereinafter referred to as chip RL information). Each of the first to Nth memory chips Chip 1 to Chip N may include a plurality of blocks, and a super block may correspond to a unit including at least one block of each of the first to Nth memory chips Chip 1 to Chip N.

The super block may be defined as various units. As an operation example, the memory system 10 may queue a plurality of write requests provided from the host and write data included in the write requests to blocks included in one super block. Accordingly, writing or reading may be performed on blocks included in the same super block in the same or similar pattern, and deterioration characteristics thereof may also be similar.

The memory 130 may include various types of high-speed memory, such as tight-coupled memory (TCM), dynamic random access memory (DRAM), static random access memory (SRAM), etc. An operation of previously storing and updating the RL information described above may be referred to as a historical read level management technique in that the optimal read level is calculated and updated whenever a data failure occurs.

A specific operation example in an embodiment will be described. In the following embodiment, it is assumed that a first block of each of the first to Nth memory chips Chip 1 to Chip N constitutes a first super block.

When a failure occurs in data read from any one block of the first super block (e.g., a first block of the first memory chip Chip 1), an algorithm for calculating the optimal read level may be performed, and super block RL information corresponding to the calculated optimal read level may be stored or updated in the first memory 131 based on the control of the RL information manager 120. For example, the first to Nth memory chips Chip 1 to Chip N may include a plurality of super blocks, the first memory 131 may store super block RL information corresponding to each of the plurality of super blocks, and a newly calculated optimal read level may be stored in the first memory 131 as the super block RL information, or the super block RL information may be updated from the existing optimal read level to the newly calculated optimal read level.

In addition, according to some embodiments, the calculated optimal read level may be further stored in the second memory 132 as chip RL information corresponding to the first memory chip Chip 1 based on the control of the RL information manager 120. For example, the chip RL information corresponding to each of the first to Nth memory chips Chip 1 to Chip N may be stored in the second memory 132. In addition, in an embodiment, as each of the first to Nth memory chips Chip 1 to Chip N includes a plurality of blocks, a plurality of pieces of chip RL information corresponding to the plurality of blocks of each of the first to Nth memory chips Chip 1 to Chip N may be stored in the second memory 132.

Thereafter, when the optimal read level of the first block of the first memory chip Chip 1 is changed, the changed optimal read level may be updated in the first memory 131 as the super block RL information corresponding to the first super block and may be updated in the second memory 132 as the chip RL information corresponding to the first memory chip Chip 1. Based on the above operation, super block RL information of the same value may be set and stored in the first memory 131 with respect to blocks belonging to the same super block, while chip RL information of different values may be set and stored in the second memory 132 with respect to blocks included in different memory chips.

Thereafter, when performing the read operation on the first block of the first memory chip Chip 1, the read operation may be performed based on information stored in the memory 130. For example, the memory controller 100 may provide information related to a read level (hereinafter referred to as RL control information CI_RL) to the memory device 200, and the memory device 200 may read data of the first block of the first memory chip Chip 1 by using a read voltage having a level based on the RL control information CI_RL.

For example, the memory controller 100 may control the read operation by first providing the RL control information CI_RL according to the super block RL information to the memory device 200. When a failure occurs in the data read based on the super block RL information, the memory controller 100 may read the chip RL information corresponding to the first memory chip Chip 1 from the second memory 132 and provide the RL control information CI_RL according to the chip RL information to the memory device 200. When a failure occurs in data read based on the chip RL information, the memory controller 100 may perform an algorithm to calculate the optimal read level of the first block of the first memory chip Chip 1 and update new super block RL information and the chip RL information in the first memory 131 and the second memory 132, respectively.

As described above, the memory system 10 stores and updates the RL information based on various units, thereby performing the read operation using the optimal read level on a block of each of the first to Nth memory chips Chip 1 to Chip N, and reducing the possibility of a data failure. In addition, characteristic variations between the first to Nth memory chips Chip 1 to Chip N may be intensified according to a NAND process. According to some embodiments, the memory system 10 stores and manages the RL information in units of chips, thereby preventing deterioration of data reliability due to the characteristic variations between the first to Nth memory chips Chip 1 to Chip N.

Figure 2:
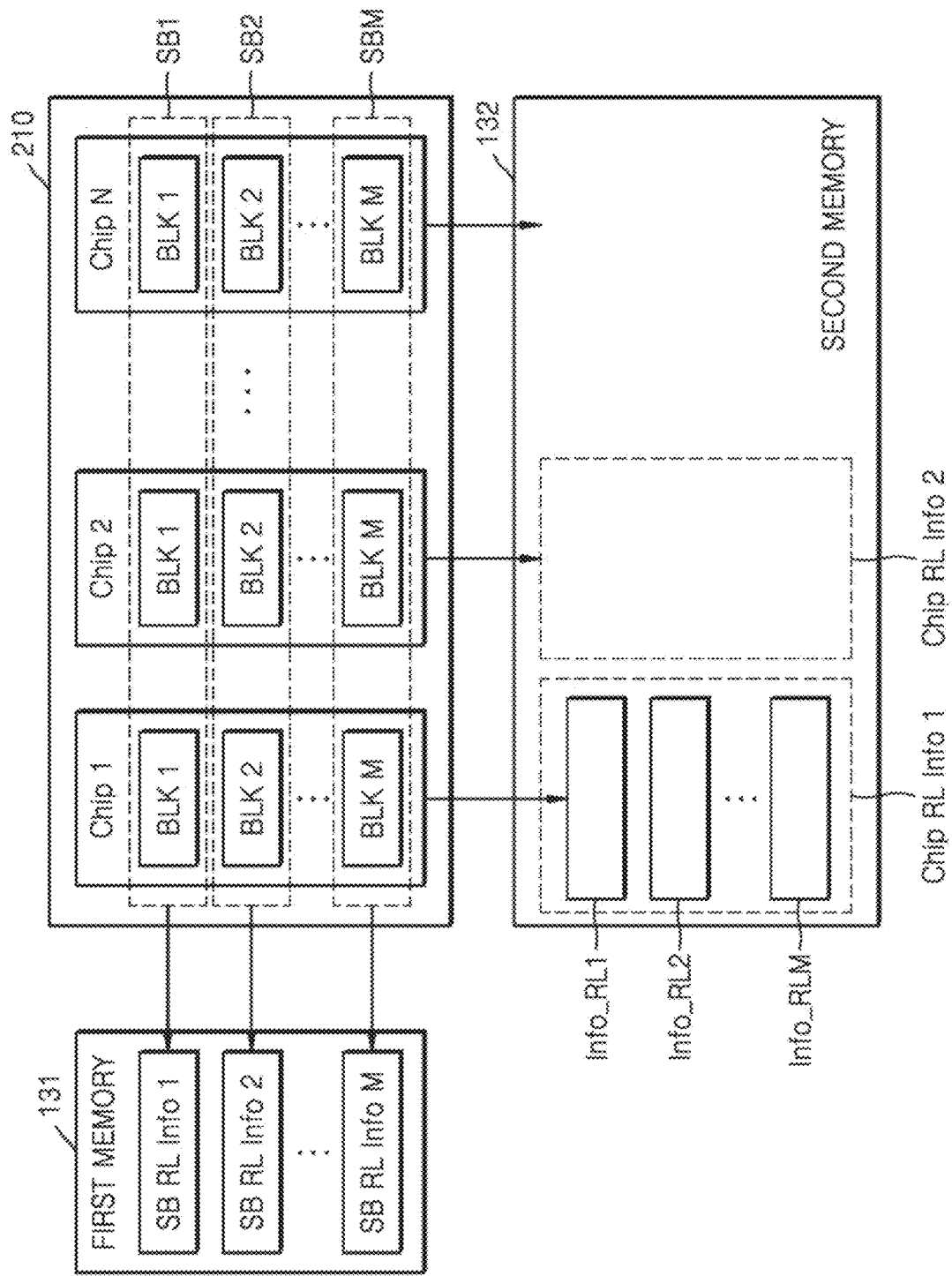
FIG. 2 is a diagram illustrating storing super block read level (RL) information and chip RL information according to some embodiments.

FIG. 2 is a diagram illustrating an example of storing super block RL information and chip RL information according to some embodiments.

Referring to FIG. 2, a memory device may include a plurality of memory chips, including the first to Nth memory chips Chip 1 to Chip N, and each of the first to Nth memory chips Chip 1 to Chip N may include first to Mth blocks BLK 1 to BLK M.

As one block of the first to Nth memory chips Chip 1 to Chip N constitutes one super block, the memory device may include first to Mth super blocks SB 1 to SB M. In addition, RL information in units of super blocks may be stored in the first memory 131. For example, the first memory 131 may store first to Mth super block RL information SB RL Info 1 to SB RL Info M respectively corresponding to the first to Mth super blocks SB 1 to SB M.

RL information in units of chips may be stored in the second memory 132 with respect to each of the first to Nth memory chips Chip 1 to Chip N. For example, separate chip RL information may be stored with respect to each of the first to Mth blocks BLK 1 to BLK M included in each of the first to Nth memory chips Chip 1 to Chip N. For example, with respect to the first memory chip Chip 1, first chip RL information Chip RL Info 1 corresponding to the first memory chip Chip 1 may include M pieces of chip RL information Info_RL1 to Info_RLM corresponding to M blocks of the chip Chip 1. In addition, with respect to the remaining memory chips, chip RL information may be stored in the second memory 132. For example, second chip RL information Chip RL Info 2 corresponding to the second memory chip Chip 2 may also include M pieces of chip RL information Info_RL1 to Info_RLM corresponding to M blocks of the chip Chip 2.

According to the above configuration, when a new optimal read level is newly calculated with respect to a block of one memory chip, a value of super block RL information corresponding to blocks of other memory chips belonging to the same super block may vary. On the other hand, as chip RL information is managed in units of memory chips, chip RL information with different values with respect to a plurality of blocks included in the same super block may be stored and managed.

Figure 3:
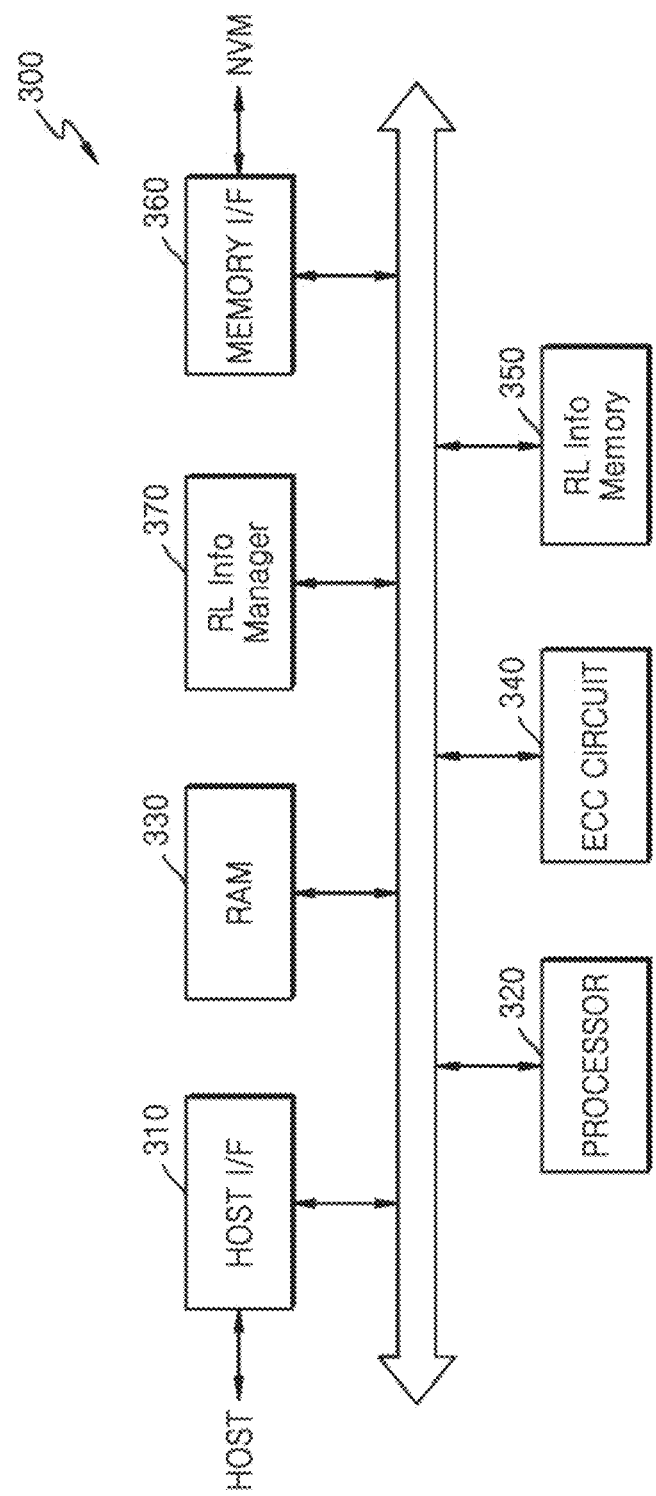
FIG. 3 is a block diagram illustrating a memory controller according to an embodiment.

FIG. 3 is a block diagram illustrating an example of implementation of a memory controller 300 according to an embodiment.

Referring to FIG. 3, the memory controller 300 may include a host interface 310, a processor 320, a RAM 330, an error correction code (ECC) circuit 340, an RL information memory 350, a memory interface 360, and RL information manager 370. In addition, the RAM 330 may be used as a working memory, and the processor 320 may control the overall operation of the memory controller 300 by executing firmware loaded into the RAM 330. The RAM 330 may be implemented with various types of memory, for example, at least one of cache memory, DRAM, SRAM, Phase Change RAM (PRAM), and flash memory devices. In addition, as an example of firmware, a flash translation layer (FTL) may be loaded into the RAM 330, and various functions related to flash memory operations may be performed by driving the FTL. In addition, software (e.g., recovery algorithm module) related to an algorithm for calculating the optimal read level according to embodiments may be loaded into the RAM 330, and when a failure occurs in data read, the algorithm to calculate the optimal read level may be executed based on the control of the processor 320.

In embodiments described above, the RL information manager 370 may be implemented through hardware, software, or a combination thereof. For example, when the RL information manager 370 is implemented as software, the RL information manager 370 of FIG. 3 may be loaded into the RAM 330 and executed by the processor 320. In an embodiment, the RL information manager 370 may be non-volatilely stored in a memory device NVM, and software constituting the RL information manager 370 read from a memory device when a memory system is initially driven may be loaded into the RAM 330 of the memory controller 300.

The RL information manager 370 may manage storage and update operations of super block RL information and chip RL information according to embodiments described above. In FIG. 3, the RL information manager 370 manages the super block RL information and the chip RL information together, but a manager managing the super block RL information and a manager managing the chip RL information may be implemented separately.

The host interface 310 may communicate with the host through various types of interfaces according to embodiments described above. In addition, the memory interface 360 provides a physical connection between the memory controller 300 and the memory device NVM. For example, commands/addresses and data may be transmitted and received between the memory controller 300 and the memory device NVM through the memory interface 360.

The ECC circuit 340 may perform an ECC operation on data read from the memory device NVM, and may perform data failure determination when an error occurs or the error is not corrected. When a data failure occurs, the algorithm to calculate the optimal read level according to embodiments described above may be executed based on the control of the processor 320. For example, a read operation may be repeatedly performed while changing read levels with respect to a block in which the data failure has occurred, and a read level with the minimal error or in which no error occurs may be calculated as the optimal read level.

The RL information memory 350 may store the super block RL information and the chip RL information according to embodiments described above. When a new optimal read level is calculated with respect to one block, the memory controller 300 may store and update the super block RL information and the chip RL information in the RL information memory 350 based on the newly calculated optimal read level. In addition, the memory controller 300 may control the read operation based on the super block RL information and the chip RL information stored in the RL information memory 350, and, when a failure occurs in both the read operation based on the super block RL information and the chip RL information, may perform the algorithm to calculate the optimal read level according to embodiments described above.

Figure 4:
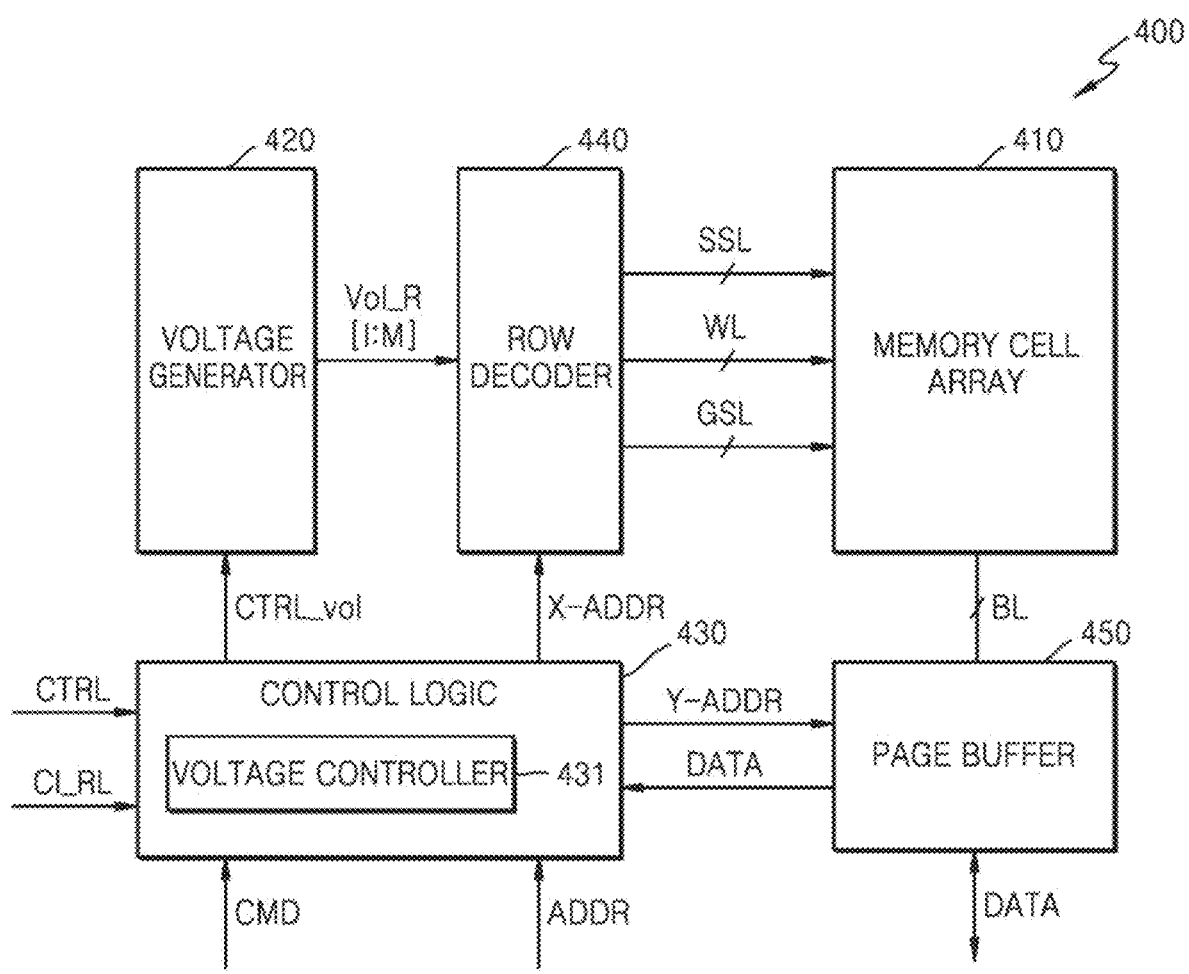
FIG. 4 is a block diagram illustrating a memory device according to some embodiments.

FIG. 4 is a block diagram illustrating an example of implementation of a memory device 400 according to some embodiments. FIG. 4 shows an example of implementation of a flash memory device as the memory device 400.

Referring to FIG. 4, the memory device 400 may include a memory cell array 410, a voltage generator 420, a control logic 430, a row decoder 440, and a page buffer 450. Memory cells of the memory cell array 410 may be connected to word lines WL, string select lines SSL, ground select lines GSL, and bit lines BL. The memory cell array 410 may be connected to the row decoder 440 through the word lines WL, the string select lines SSL, and the ground select lines GSL, and may be connected to the page buffer 450 through the bit lines BL. Each of the memory cells may store one or more bits, and, for example, each memory cell may correspond to a multi-level cell (MLC), a triple level cell (TLC), or a quad level cell (QLC), or may store data of more bits.

As described above, the memory device 400 may include a plurality of memory chips, and the memory cell array 410 may include memory cells of the plurality of memory chips. The memory device 400 of some embodiments may be implemented in various ways, and, for example, each memory chip may include peripheral circuits such as the row decoder 440 and the page buffer 450 together with the memory cell array 410. In an embodiment, the voltage generator 420 and the control logic 430 may be provided inside the memory chip, or may be separately provided outside the memory chip.

The control logic 430 may output various internal control signals for controlling program, read, and erase operations in the memory cell array 410 based on the command CMD, the address ADDR, and the control signal CTRL received from a memory controller. For example, the control logic 430 includes a voltage controller 431, may output a voltage control signal CTRL_vol for controlling levels of various voltages generated by the voltage generator 420, provide a row address X-ADDR to the row decoder 440, and provide a column address Y-ADDR to the page buffer 450.

In an embodiment, the control logic 430 may output the voltage control signal CTRL_vol based on RL control information CI_RL from the memory controller. For example, in relation to a read operation on one block, the control logic 430 may adjust a read level by first receiving the RL control information CI_RL based on super block RL information and outputting the voltage control signal CTRL_vol. When a failure occurs in data read based on the super block RL information, the control logic 430 may receive the RL control information CI_RL based on chip RL information again from the memory controller, and output the voltage control signal CTRL_vol for generating a read voltage having a read level corresponding to the chip RL information.

In an embodiment, the super block RL information and the chip RL information stored in the memory controller may be stored in a storage space (e.g., memory cells in the memory cell array 410) in the memory device 400 periodically or aperiodically, or when the power of the memory system is turned off, may be stored non-volatilely in the storage space in the memory device 400. Thereafter, when power is applied to the memory system, the super block RL information and the chip RL information may be provided to the memory controller, and the memory controller may control a data read operation using the previously calculated super block RL information and chip RL information.

Figure 5:
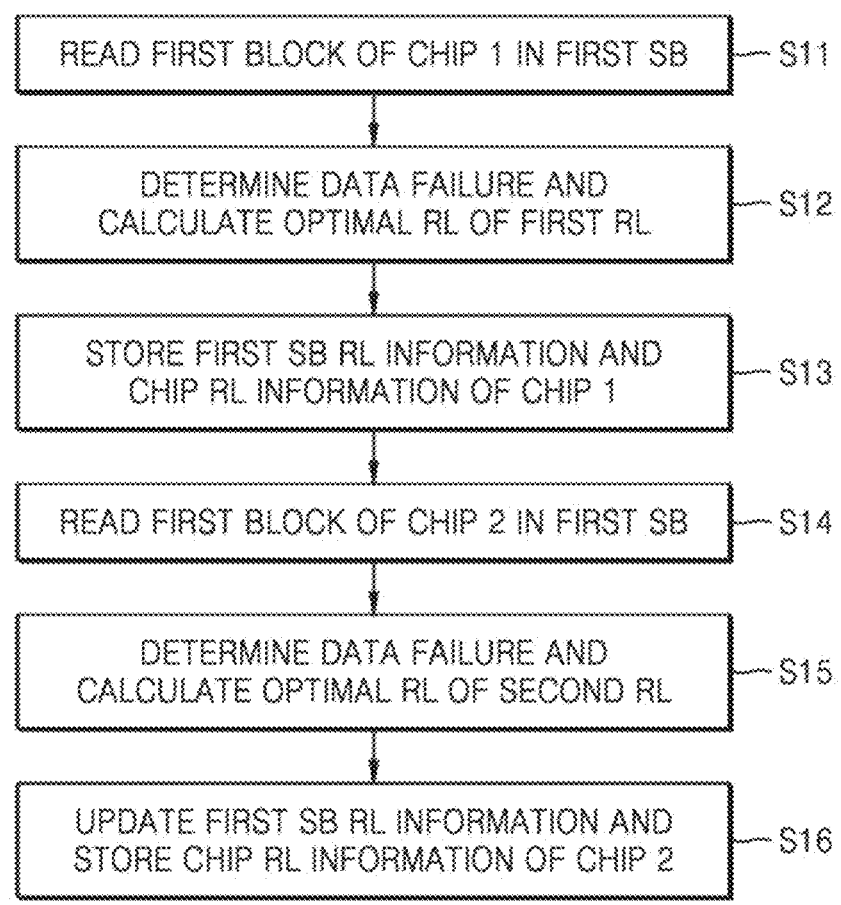
FIGS. 5 and 6 are flowcharts illustrating an operating method of a memory system according to some embodiments.
Figure 6:
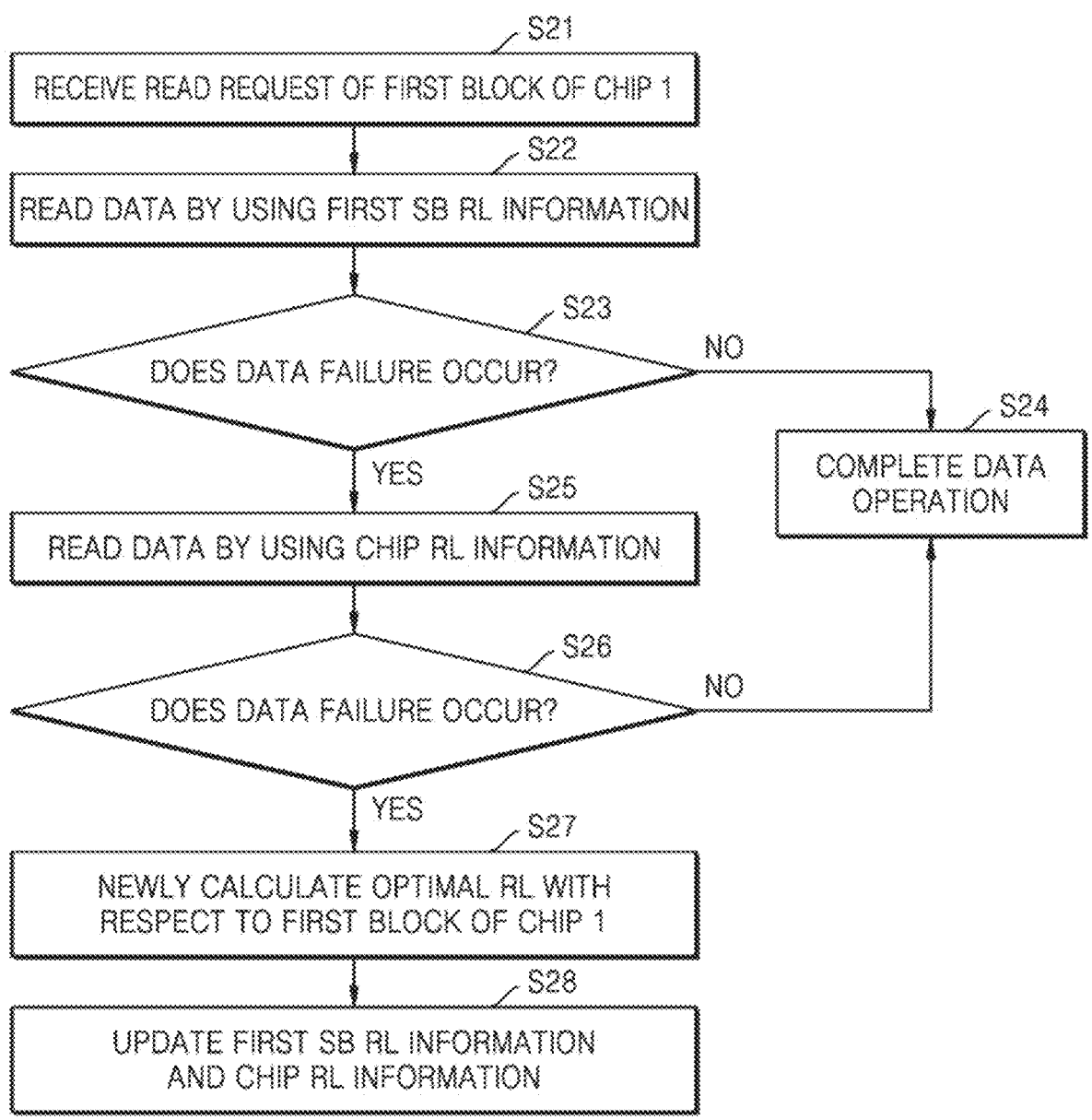

FIGS. 5 and 6 are flowcharts illustrating an operating method of a memory system according to some embodiments. For example, the memory system may include a memory controller and a memory device, and each operation shown in FIGS. 5 and 6 may be an operation performed by the memory controller or the memory device.

Referring to FIG. 5, the memory device may include a plurality of memory chips, and blocks included in the plurality of memory chips may constitute a super block. For example, a first super block may correspond to a configuration including a first block of each of first to Nth memory chips.

According to a request from a host, the memory controller may control reading of the first block of the first memory chip included in the first super block SB (S11). The memory controller may perform error detection/correction on data read from the first block of the first memory chip of the memory device and determine whether a failure occurs in the data according to preset conditions. For example, the memory controller may determine whether a data failure occurs when more than a certain number of errors occur or an uncorrectable error occurs in the data.

When it is determined that the failure occurs in the data, the memory controller may calculate a first read level as the optimal read level with respect to the first block of the first memory chip (S12). The memory controller may include a first memory storing super block RL information and a second memory storing chip RL information, and the super block RL information corresponding to a plurality of super blocks may be stored in the first memory. The memory controller may store the calculated first read level in the first memory as first super block RL information corresponding to the first super block.

In addition, the chip RL information of each of the first to Nth memory chips may be stored in the second memory, and, for example, chip RL information corresponding to a plurality of blocks included in each of the first to Nth memory chips may be stored. The memory controller may store the calculated first read level in the second memory as chip RL information corresponding to the first block of the first memory chip (S13).

Thereafter, according to a request from the host, the memory controller may control reading of a first block of a second memory chip included in the first super block (S14). As the first block of the second memory chip is included in the first super block, the memory controller may control the memory device to perform a read operation at a read level based on the first super block RL information stored in the first memory. When a fail occurs in data read based on the first super block RL information, and the chip RL information corresponding to the first block of the second memory chip is not yet stored in the second memory, the memory controller may perform an algorithm to calculate the optimal read level of the first block of the second memory chip, and calculate a second read level as the optimal read level (S15). In addition, the memory controller may update the calculated second read level in the first memory as the first super block RL information corresponding to the first super block, and store the calculated second read level in the second memory as the chip RL information corresponding to the first memory of the second memory chip (S16).

Referring to FIG. 6, the memory controller may receive a read request for the first block of the first memory chip included in the first super block from the host (S21). The memory controller may control data read with respect to the first block of the first memory chip according to the read level based on the first super block RL information corresponding to the first super block (S22).

The memory controller may determine whether a failure occurs in the read data (S23), and, when the failure does not occur in the read data, complete the read operation by outputting the data to the host (S24). On the other hand, when the failure occurs in the read data, the memory controller may control reading of the data with respect to the first block of the first memory chip according to the read level based on the chip RL information corresponding to the first block of the first memory chip (S25). The memory controller may determine whether the read data has failed based on the chip RL information (S26), and when no data fail has occurred, the read operation may be completed by outputting the data to the host (S24).

On the other hand, when a failure occurs in data read based on chip RL information, the memory controller may newly calculate the optimal read level with respect to the first block of the first memory chip by executing an algorithm to calculate the optimal read level according to embodiments described above (S27). In addition, the memory controller may update the newly calculated optimal read level as the first super block RL information corresponding to the first super block, and may also update the newly calculated optimal read level as the chip RL information corresponding to the first block of the first memory chip (S28).

According to some embodiments as described above, with regard to blocks included in the same super block, a memory operation is performed according to a common request from the host, and thus, deterioration characteristics of the blocks tend to be similar, and the optimal read level is also highly likely to have a similar value. Accordingly, the super block RL information may be managed in units of each super block, and may be updated when a data failure occurs, thereby reducing the possibility of failure during a data reading process.

In addition, a degree of integration of the memory device may increase and the number of memory chips employed in the memory device may increase. According to some embodiments, RL information in units of chips may be utilized, and chip RL information with respect to each of blocks included in each memory chip may be managed, thereby reducing the possibility of data failure in the data reading operation using the RL information despite characteristic variations between chips.

Various methods may be applied to a recovery algorithm for calculating the above-described optimal read level. For example, the optimal read level may be calculated based on various methods such as Pre-Defined Table (PDT), Least Read Estimation (LRE), On-chip Valley Search (OVS), etc.

Figure 7:
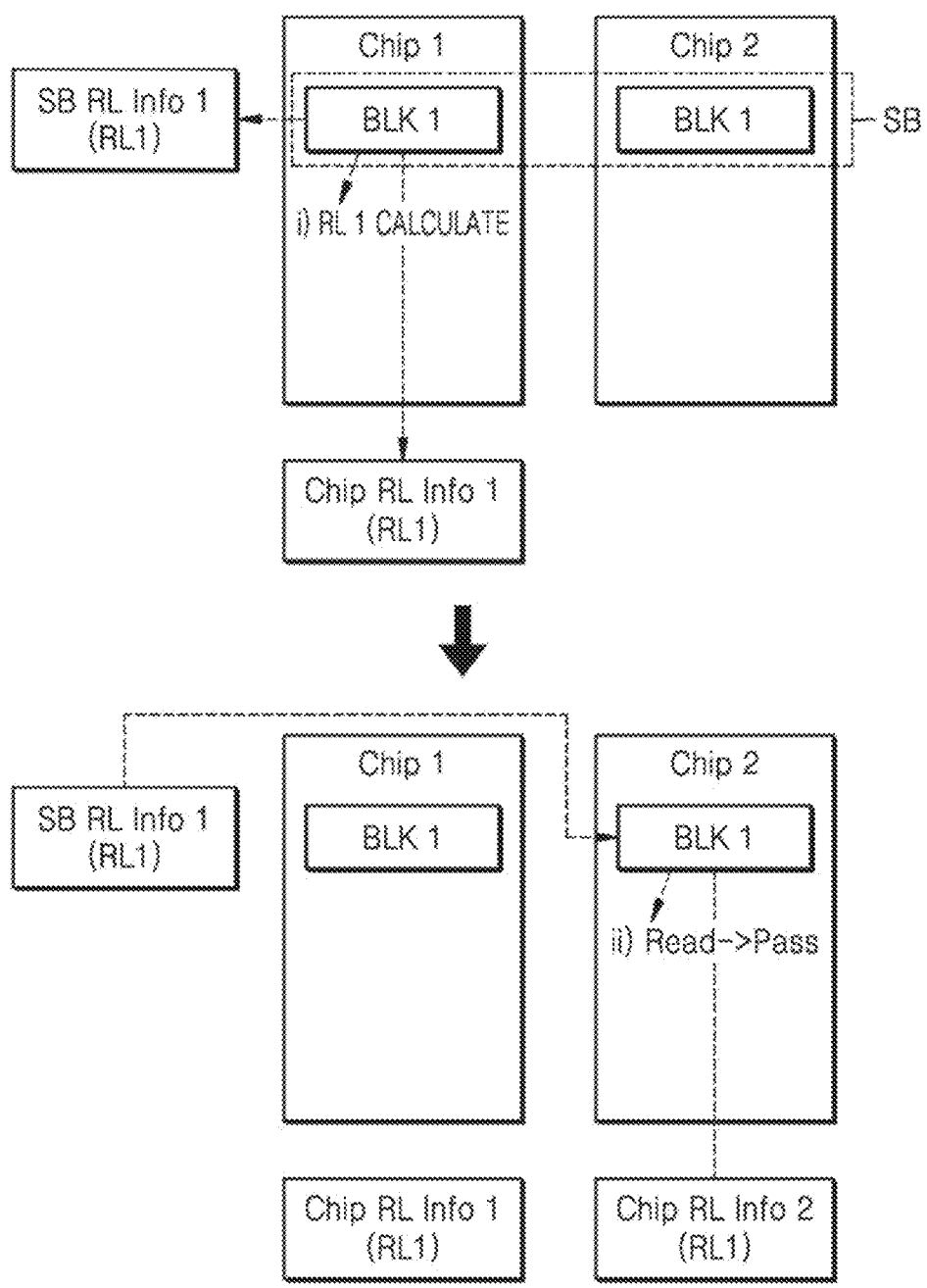
FIG. 7 is a diagram illustrating storing super block RL information and chip RL information according to various embodiments.

FIG. 7 is a diagram illustrating storing super block RL information and chip RL information according to various embodiments.

Referring to FIG. 7, the first block BLK 1 of the first memory chip Chip 1 and a first block of the second memory chip Chip 2 may be included in the same first super block SB 1, and a first read level RL1 may be calculated as the optimal read level with respect to the first block BLK 1 of the first memory chip Chip 1. The calculated first read level RL1 may be stored in a first memory as the first super block RL information SB RL Info 1 corresponding to the first super block SB 1. In addition, the first read level RL1 may be stored in a second memory as the first chip RL information Chip RL Info 1 corresponding to the first block BLK 1 of the first memory chip Chip 1.

Thereafter, a read operation may be performed on the first block BLK 1 of the second memory chip Chip 2 according to a request from a host, and a memory controller may control the read operation on the first block BLK 1 of the second memory chip Chip 2 by using the first super block RL information SB RL Info 1 corresponding to the first super block SB 1. The memory controller may determine a pass because no failure occurs in data read from the first block BLK 1 of the second memory chip Chip 2. At this time, in an embodiment, the previously calculated first read level RL1 may be stored in a second memory as the second chip RL information Chip RL Info 2 corresponding to the first block BLK 1 of the second memory chip Chip 2.

As described above, the optimal read level calculated with respect to a block of one memory chip may be stored in the second memory as chip RL information corresponding to a block of another memory chip. For example, even when an algorithm for calculating the optimal read level with respect to the first block BLK 1 of the second memory chip Chip 2 is not directly performed, when data read from the first block BLK 1 of the second memory chip Chip 2 is passed by the optimal read level calculated with respect to a block of another memory chip belonging to the same super block, the optimal read level calculated with respect to the other memory chip may be stored as chip RL information with respect to the first block BLK 1 of the second memory chip Chip.

Figure 8A:
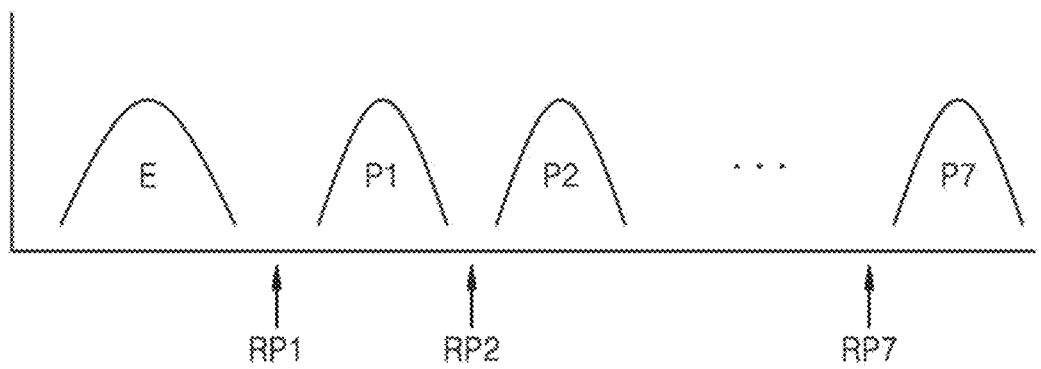
Figure 9:
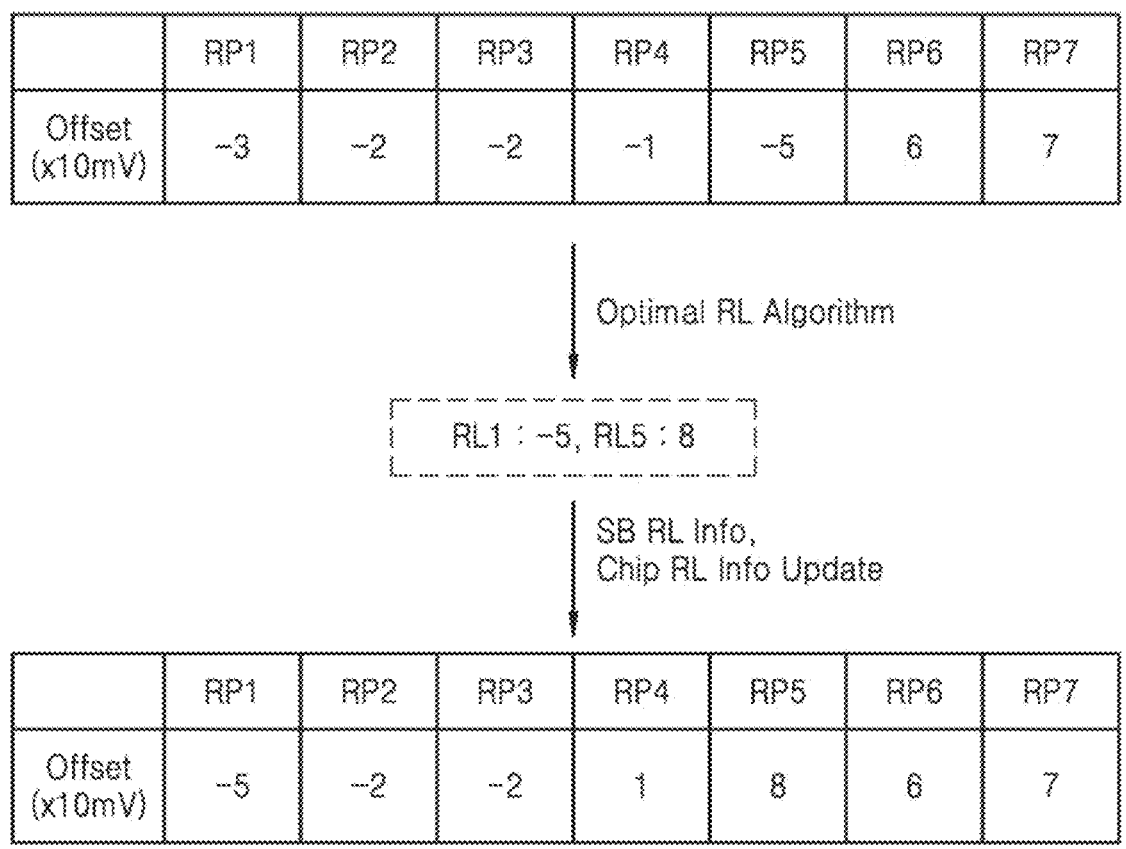

FIGS. 8A, 8B and 9 are diagrams illustrating a memory device includes multi-level cells. For example, it is assumed that each of memory cells of the memory device corresponds to a TLC that stores data of 3 bits according to embodiments.

Referring to FIG. 8A, the memory cells of the memory device may be programmed from an erase state E to first to seventh program states P1 to P7. For example, the memory cells in the erase state E may have a threshold voltage distribution of a relatively low voltage level, whereas the memory cells in the seventh program state P7 may have a threshold voltage distribution of a relatively high voltage level. In addition, in order to determine threshold voltage distributions, first to seventh read positions RP1 to RP7 may be defined as a plurality of read positions, and the optimal read level according to some embodiments may be calculated at each of the read positions RP1 to RP7, and the calculated optimal read level may be stored as super block RL information and chip RL information.

FIG. 8B shows an example of super block RL information or chip RL information. Assuming that FIG. 8B shows first super block RL information corresponding to a first super block, an algorithm for calculating the optimal read level may be performed with respect to the first read position RP1 determining the erase state E and the first program state P1, the second read position RP2 determining the first program state P1 and the second program state P2, and the seventh read position RP7 determining the sixth program state P6 and the seventh program state P7, and the optimal read level calculated at each of the first to seventh read positions RP1 to RP7 as described above may be stored in the first memory as first super block RL information.

For example, the super block RL information or the chip RL information may be information indicating various values. For example, a base level may be predefined at each read position, and the super block RL information or the chip RL information may include offset values with respect to the base level in relation to the optimal read level. For example, each offset increment may correspond to a voltage difference, such as 10 mV. When −1000 mV corresponds to the base level at the first read position RP1, the optimal read level at the first read position RP1 may correspond to −1030 mV by reflecting the offset value of −3. In addition, when 3000 mV corresponds to the base level at the seventh read position RP7, the optimal read level at the seventh read position RP1 may correspond to 3070 mV by reflecting the offset value of 7. In an embodiment, the base level of each of the first to seventh read positions RP1 to RP7 is previously stored and its value does not change, whereas an offset value may be calculated in relation to the optimal read level. In this regard, the offset value may change.

When the super block RL information shown in FIG. 8B is calculated with respect to a first block of a first memory chip, the super block RL information shown in FIG. 8B may be stored in a second memory as chip RL information corresponding to the first block of the first memory chip. That is, according to embodiments, when the optimal read level is calculated from a block of one memory chip, the calculated optimal read level is updated as super block RL information in the first memory, and may be stored or updated in the second memory as chip RL information corresponding to the other memory chip.

In FIGS. 8A and 8B, the seven read positions RP1 to RP7 are defined when each memory cell corresponds to the TLC, but some embodiments are not necessarily limited thereto. For example, in the memory device, the memory cells may be utilized together as a TLC, MLC, and SLC, in which case 7 read positions in relation to the memory cells corresponding to the TLC may be defined, 3 read positions in relation to the memory cells corresponding to the MLC may be defined, 11 read positions including one read position in relation to the memory cells corresponding to the SLC may be defined, and the optimal read level may be calculated at each of the first to seventh read positions RP1 to RP7.

FIG. 9 is a diagram illustrating an example of updating super block RL information or chip RL information.

Referring to FIGS. 8A, 8B and 9, when calculating the optimal read level with respect to one block, the optimal read level may be calculated with respect to some of the first to seventh read positions RP1 to RP7 (e.g., 7 read positions in the case of TLC). In addition, when updating the super block RL information or the chip RL information, only the optimal read level of some of the first to seventh read positions RP1 to RP7 may be selectively updated.

For example, with respect to the first block of the first memory chip, when the optimal read level is calculated at the first read position RP1 determining the erase state E and the first program state P1 and the fifth read position RP5 determining the fourth program state P4 and the fifth program state P5, RL information may be selectively updated only with respect to the first read position RP1 and the fifth read position RP5. Assuming that the RL information is the offset value described above, the RL information at the first read position RP1 may be updated to −5, and the RL information at the fifth read position RP5 may be updated to 8.

Thereafter, when a read operation is performed on blocks included in the first super block, the read operation may be performed based on the first super block RL information corresponding to the updated first super block. In addition, when a failure occurs in data read based on the first super block RL information, data may be read based on different chip RL information for each chip. When a failure occurs in all data read based on super block RL information and chip RL information with respect to a first block of a memory chip other than the first memory chip, the optimal read level may be calculated at least one read position with respect to the block in which the failure occurred, and the newly calculated optimal read level may be updated in the first memory and the second memory according to embodiments described above.

Figure 10:
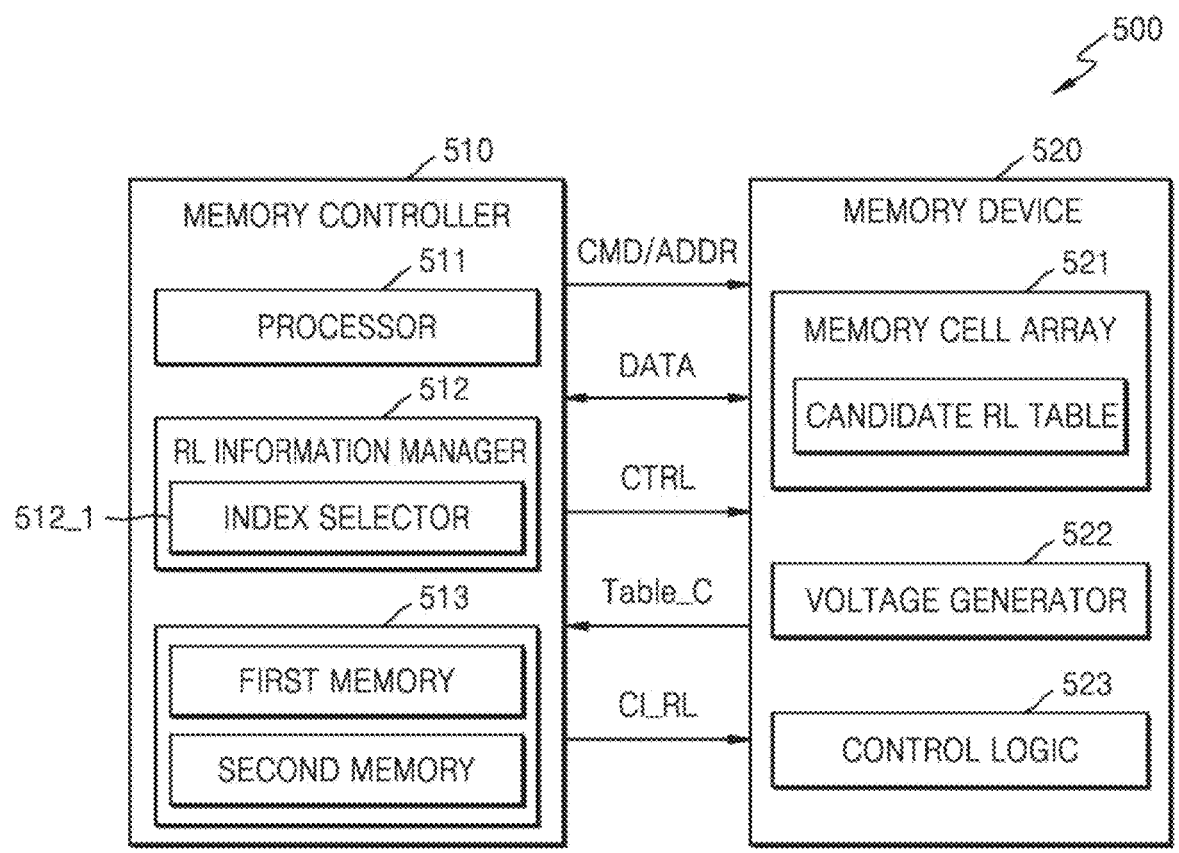
FIG. 10 is a block diagram illustrating a memory system according to some embodiments.

FIG. 10 is a block diagram illustrating a memory system 500 according to some embodiments. In FIG. 10, an example of reducing a storage space of a memory as a resource storing chip RL information is explained.

The memory system 500 may include a memory controller 510 and a memory device 520, and the memory device 520 may include a memory cell array 521, a voltage generator 522, and a control logic 523. In addition, the control logic 523 may include a voltage controller according to embodiments.

The memory controller 510 may include a processor 511, an RL information manager 512, and a memory 513. The RL information manager 512 may include an index selector 512_1, and the memory 513 may include a first memory storing super block RL information and a second memory storing chip RL information. In addition, the memory cell array 521 may store a candidate RL table Table_C. For example, the candidate RL table Table_C may include a plurality of entries, and each entry may include candidate RL information corresponding to an index.

The candidate RL table Table_C may include a plurality of pieces of RL information applicable to a read operation in relation to the control of a read level, and the plurality of candidate RL information may be indicated by indexes having different values. According to some embodiments, super block RL information stored in the first memory and/or chip RL information stored in the second memory may correspond to the above-described index. In an embodiment, an amount of the super block RL information is relatively smaller than that of the chip RL information, and thus, an actually calculated read level may be stored as the super block RL information. On the other hand, in relation to RL information with respect to each memory chip, candidate RL information with the most similar value (or minimum difference value) to the actually calculated read level may be selected from among the plurality of pieces of candidate RL information provided in the candidate RL table Table_C, and an index corresponding to the selected candidate RL information may be stored as the chip RL information.

The memory controller 510 may provide the address ADDR, the command CMD, and the control signal CTRL to the memory device 520, and may communicate the data DATA with the memory device 520. In addition, when the candidate RL table Table_C is stored in the memory device 520, the memory controller 510 may receive the candidate RL table Table_C from the memory device 520, and may provide RL control information CI_RL for controlling a read level related to a read operation of data to the memory device 520 by referring to the super block RL information and the chip RL information stored in the memory 513

The RL information manager 512 may manage an operation of storing the super block RL information and the chip RL information in the memory 513 according to embodiments. The index selector 512_1 may compare the optimal read level calculated with respect to one block with the plurality of pieces of candidate RL information of the candidate RL table Table_C, and determine at least one candidate RL information having the most similar value to the calculated optimal read level. For example, the index selector 512_1 may perform various calculation operations using the calculated optimal read level and the plurality of pieces of candidate RL information of the candidate RL table Table_C, and select at least one candidate RL information from the candidate RL table Table_C based on calculation results.

As described above, when managing the RL information in units of chips, only the index may be stored in the second memory, thereby reducing resources required for managing the chip RL information. For example, when the candidate RL table Table_C includes 256 entries, the index may have a size of 1 byte. Accordingly, only the storage space of 1 byte is required to store the chip RL information with respect to one block of each memory chip in the second memory, and thus, resources such as area and cost required to implement the second memory may be reduced.

In FIG. 10, the candidate RL table Table_C is stored in the memory cell array 521 within the memory device 520, but some embodiments are not necessarily limited thereto. For example, the memory controller 510 or the memory device 520 may include a storage circuit that non-volatilely stores information, the candidate RL table Table_C may be stored in the storage circuit, may be read from the storage circuit in an initial setup process of the memory system 500, and loaded into a certain memory (e.g., volatile memory) within the memory controller 510.

Figure 11:
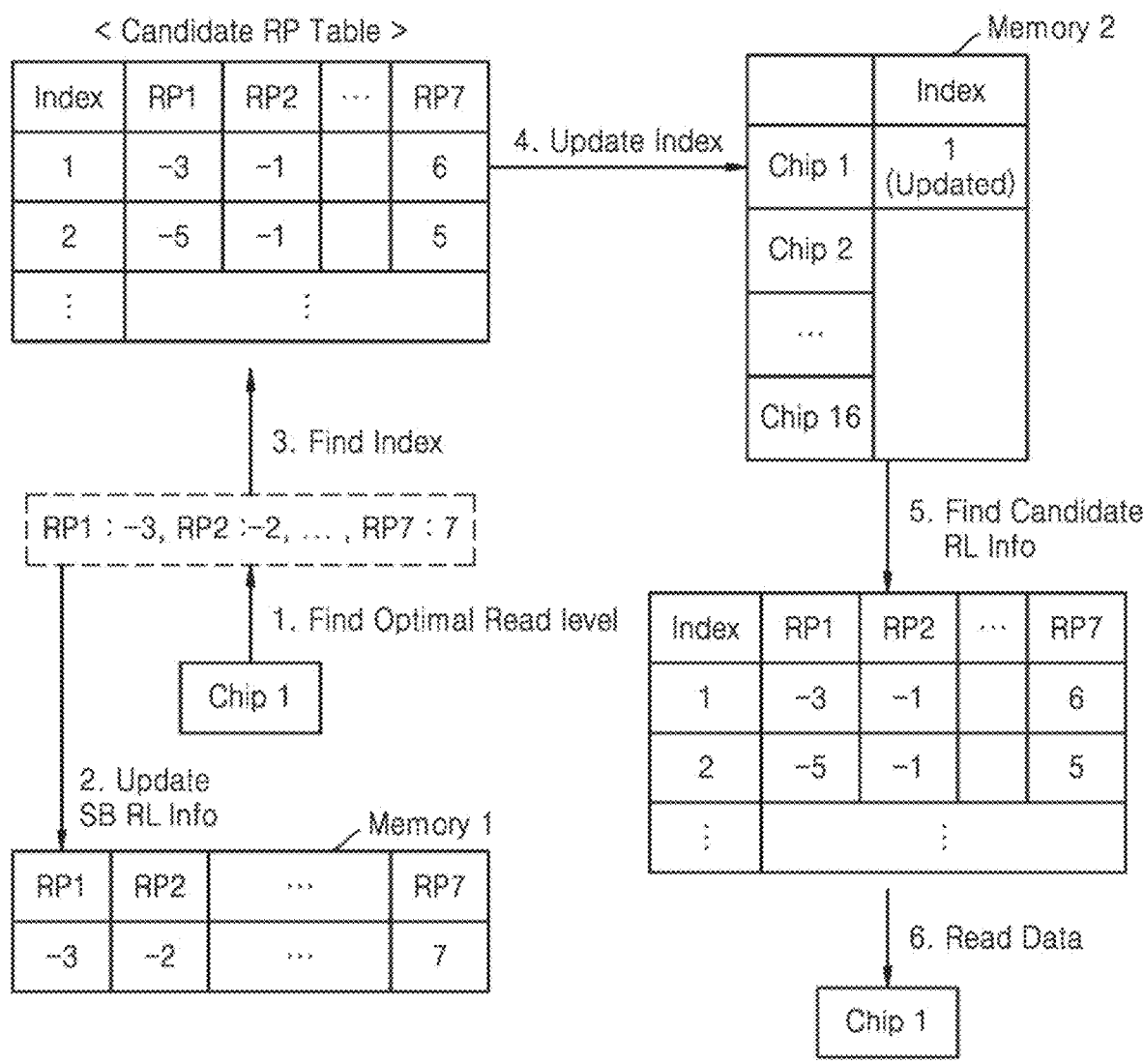
FIG. 11 is a diagram illustrating operation of a memory system according to some embodiments.

FIG. 11 is a diagram illustrating an example of operation of the memory system 500 shown in FIG. 10. In FIG. 11, one RL information indicates read levels of the first to seventh read positions RP1 to RP7 according to embodiments.

As a failure occurs in data read from a first block of the first memory chip Chip 1, the optimal read level with respect to the first block of the first memory chip Chip 1 may be calculated. The calculated optimal read level may be stored in a first memory as first super block RL information corresponding to a first super block to which the first block of the first memory chip Chip 1 belongs.

A memory controller may determine an index corresponding to the candidate RL information that is the most similar to the optimal read level through a comparison operation between the calculated optimal read level and the plurality of pieces of candidate RL information included in the candidate RL table Table_C. For example, candidate RL information corresponding to an index with the value of "1" may be selected from the plurality of pieces of candidate RL information included in the candidate RL table Table_C.

Chip RL information related to a plurality of memory chips may be stored in the second memory. For example, each memory chip may include a plurality of blocks, chip RL information with respect to each of the plurality of blocks may be stored, and the index with the value of "1" selected in relation to the first block of the first memory chip Chip 1 may be stored as the chip RL information in the second memory.

Thereafter, when a read request for the first block of the first memory chip Chip 1 is received, a read operation using the super block RL information stored in the first memory may be performed first, and, when a data failure occurs in the read operation, the read operation may be performed using the chip RL information stored in the second memory. At this time, the memory controller may read the index with the value of "1" corresponding to the first block of the first memory chip Chip 1 from the second memory, and determine candidate RL information corresponding to the index with the value of "1" by referring to the candidate RL table Table_C. The memory controller may read data of the first block of the first memory chip Chip 1 based on the candidate RL information corresponding to the index with the value of "1".

When a failure occurs even with respect to the data read based on the chip RL information, an algorithm for calculating the optimal read level may be performed according to embodiments, and the super block RL information may be updated to the newly calculated optimal read level. In addition, one candidate RL information may be selected from among the multiple candidate RL information in the candidate RL table Table_C according to the newly calculated optimal read level, and an index corresponding to the newly selected candidate RL information may be updated in the second memory in relation to the first block of the first memory chip Chip 1.

The operation of determining the candidate RL information that is the most similar to the optimal read level among the plurality of pieces of candidate RL information may be performed in various ways. For example, when differences between the optimal read level and values of the plurality of pieces of candidate RL information are defined as errors, candidate RL information with the smallest error may be selected based on a calculation operation such as Mean Absolute Error (MAE), Mean Square Error (MSE), etc. Alternatively, machine learning technology may be applied in determining the candidate RL information with the minimum difference from the optimal read level, and weights may be assigned to the values used in calculation operations using the optimal read level and the plurality of pieces of candidate RL information.

Figure 12:
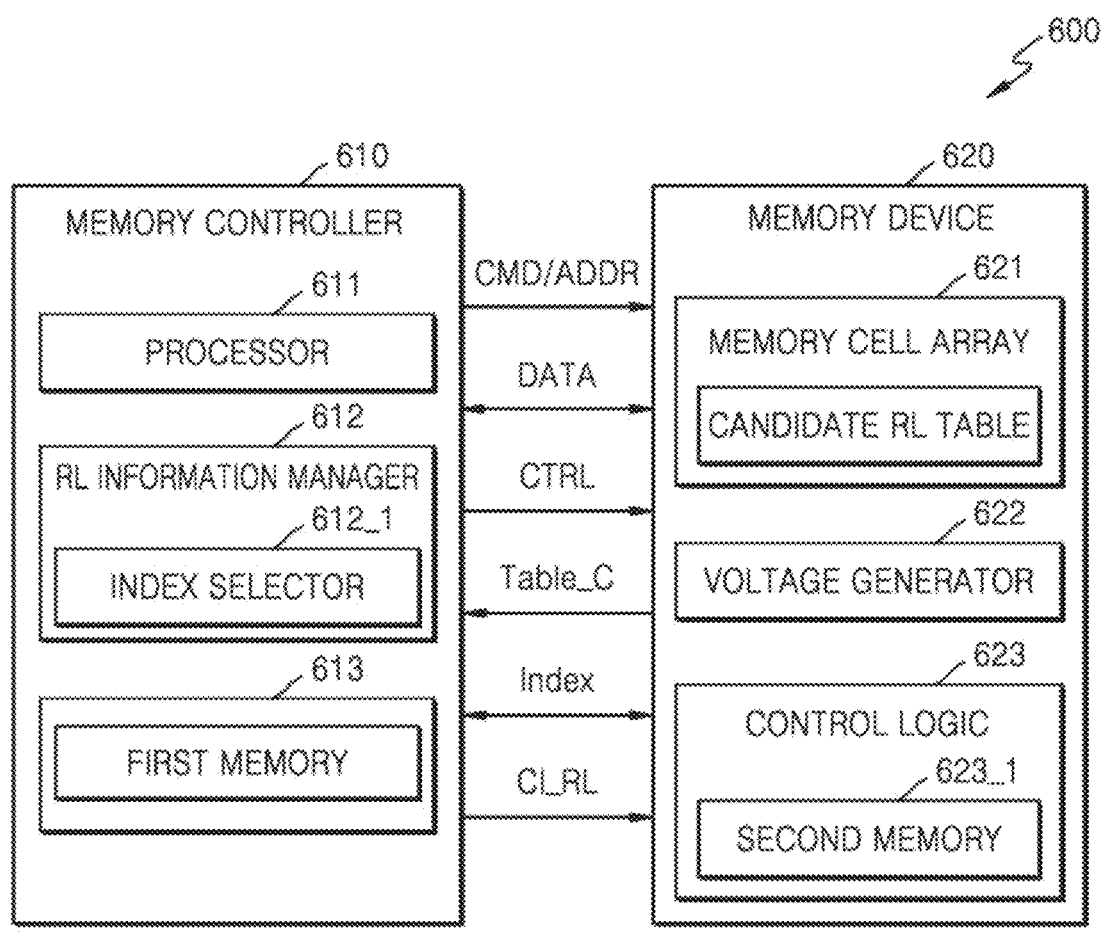
FIG. 12 is a block diagram illustrating a memory system according to some embodiments.

FIG. 12 is a block diagram illustrating a memory system 600 according to some embodiments. In FIG. 12, an example in which chip RL information is stored in a memory device 620 is explained.

Referring to FIG. 12, the memory system 600 may include a memory controller 610 and the memory device 620, and the memory device 620 may include a memory cell array 621, a voltage generator 622, and control logic 623. In addition, the memory cell array 621 may include the candidate RL table Table_C according to embodiments, and the control logic 623 may include a second memory 623_1 that stores the chip RL information. The control logic 523 may include a voltage controller according to embodiments.

In FIG. 12, the candidate RL table Table_C is stored in the memory cell array 621, but the candidate RL table Table_C may be stored in another storage circuit within the memory device 620. In addition, in FIG. 12, the second memory 623_1 is provided within the control logic 623, but the second memory 623_1 may be implemented as another storage circuit within the memory device 620, or the chip RL information may be stored in the memory cell array 621 without the second memory 623_1. In this case, the second memory 623_1 may correspond to some memory cells of the memory cell array 621.

The memory controller 610 may include a processor 611, an RL information manager 612, and a first memory 613, and the RL information manager 612 may include an index selector 612_1 according to embodiments. The memory controller 610 may provide the address ADDR, the command CMD, and the control signal CTRL to the memory device 620, and may communicate the data DATA with the memory device 620. In addition, the memory controller 610 may receive the candidate RL table Table_C from the memory device 620 and provide the RL control information CI_RL to the memory device 620 to control a read level related to a read operation of data.

According to an embodiment, the memory controller 610 may calculate the optimal read level with respect to blocks of a plurality of memory chips provided in the memory cell array 621, and store and update super block RL information in the first memory 613 based on a calculation result. In addition, the memory controller 610 may perform a comparison operation between the calculated optimal read level and the plurality of pieces of candidate RL information included in the candidate RL table Table_C, and provide an index selected based on a comparison result to the memory device 620 as the chip RL information.

The second memory 623_1 may store the chip RL information according to embodiments. In an embodiment, the second memory 623_1 may include a storage circuit that stores information non-volatilely or volatilely. In addition, when the memory device 620 includes N memory chips and each of the N memory chips includes M blocks, the second memory 623_1 may include a storage space storing N*M chip RL information. As described above, when each index has a size of 1 byte, the second memory 623_1 may have a size of at least N*M bytes.

The memory device 620 may include a special function register (SFR), and the SFR, which is a component that stores information, may include various elements such as a fuse, an e-fuse, an anti-fuse, etc. In addition, storage spaces of the SFR may be indicated by a universal internal bus (UIB) address or an UIB value. In an embodiment, the second memory 623_1 storing the chip RL information may correspond to some storage spaces of the SFR, and the UIB address indicating the some storage spaces may be allocated for storage of the chip RL information. When providing an index to the memory device 620, the memory controller 610 may provide the memory device 620 with the UIB address indicating a storage position of the index within the SFR. In addition, when the memory device 620 includes N memory chips and each of the N memory chips includes M blocks, N*M UIB addresses may be allocated in relation to the storage of the chip RL information.

As described above, the chip RL information may be stored and managed within the memory device 620, and, when the chip RL information is stored in the memory cell array 621, RL information in units of chips may be stored and managed without an additional resource.

Figure 13:
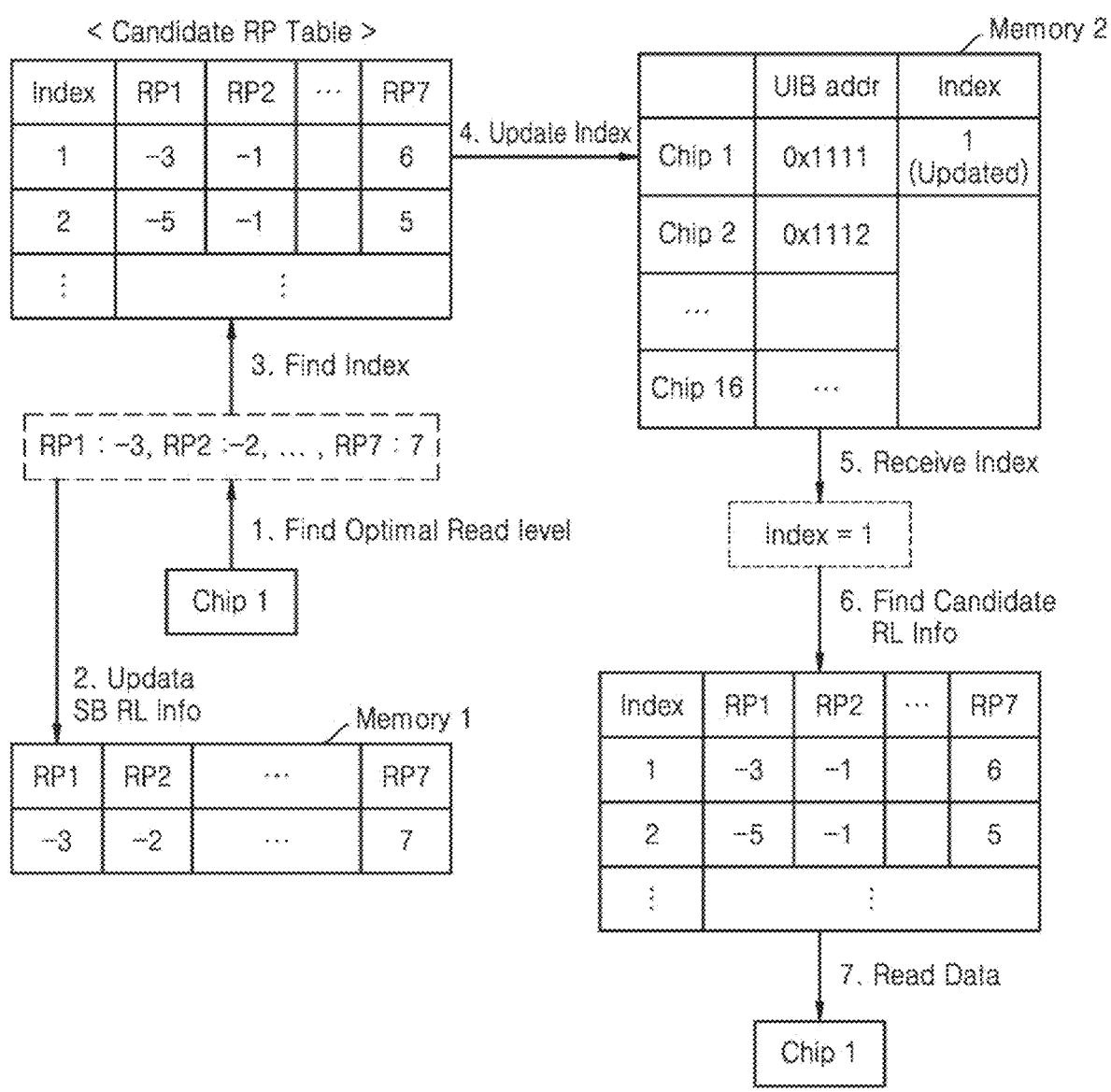
FIG. 13 is a diagram illustrating operation of a memory system according to some embodiments.

FIG. 13 is a diagram illustrating an example of operation of the memory system 600 shown in FIG. 12.

Referring to FIG. 13, the optimal read level with respect to a first block of the first memory chip Chip 1 may be calculated, and the calculated optimal read level may be stored in a first memory as first super block RL information corresponding to a first super block to which the first block of the first memory chip Chip 1 belongs. In addition, the memory controller 610 may select an index (e.g., index with a value of "1") corresponding to one candidate RL information and provide the selected index to the memory device 620, through a comparison operation between the calculated optimal read level and a plurality of pieces of candidate RL information included in the candidate RL table Table_C.

The memory device 620 may store or update the received index in an area corresponding to the first block of the first memory chip Chip 1 in the SFR. For example, the memory controller 610 may provide the selected index to the memory device 620 along with an UIB address assigned to the first block of the first memory chip Chip 1.

Thereafter, when reading data of the first block of the first memory chip Chip 1 at a request of a host, the memory controller 610 may control a read operation based on super block RL information stored in the first memory 613. When a failure occurs in data read based on the super block RL information, the memory controller 610 may output the UIB address assigned to the first block of the first memory chip Chip 1, and receive the index corresponding to the first block of the first memory chip Chip 1 from the memory device 620 as chip RL information.

The memory controller 610 may determine candidate RL information corresponding to the received index among the plurality of pieces of candidate RL information included in the candidate RL table Table_C, and control the read operation on data with respect to the first block of the chip Chip 1 based on an RL corresponding to the candidate RL information.

Figure 14:
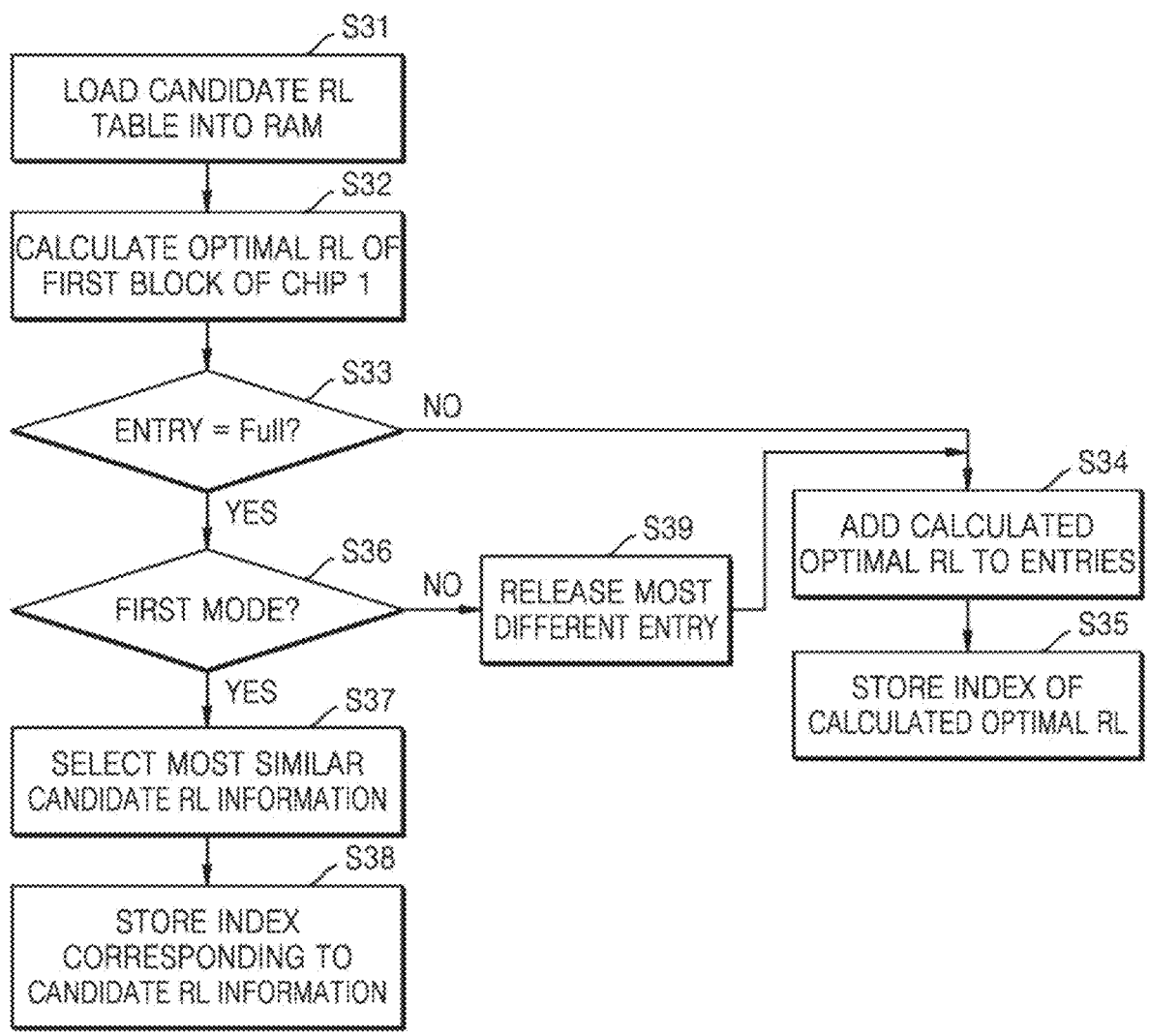
FIG. 14 is a flowchart illustrating operation of a memory system using a candidate RL information table and index according to an embodiment.

FIG. 14 is a flowchart illustrating an example of various operating methods of a memory system using an index. In FIG. 14, as it is possible to add and release a plurality of entries included in a candidate RL table, a method of securing candidate RL information with a value similar to a newly calculated optimal read level is proposed.

The candidate RL table may be non-volatilely stored in the memory system, and during an initial driving operation of the memory system, the candidate RL table may be loaded into volatile memory (e.g., RAM) within a memory controller (S31). Thereafter, the optimal read level of a first block of the first memory chip Chip 1 may be calculated according to embodiments described above (S32).

In some embodiments, entries of the candidate RL table may be loaded into the RAM, and additional entries may be further loaded into the RAM. For example, at least one optimal read level calculated during the operation of the memory system may be further loaded into the RAM as at least one entry, and an index value corresponding to the newly loaded optimal read level may be calculated. As the optimal read level is calculated with respect to the first block of the first memory chip Chip 1, it may be determined whether the entries loaded into the RAM are in a full state (S33), and when the entries are not in the full state, the optimal read level may be added to the entries as the candidate RL information (S34). In addition, an index corresponding to the optimal read level newly added to the entries may be stored as the chip RL information in a memory (e.g., a second memory) (S35).

On the other hand, when the entries are in the full state, it may be determined whether management of the candidate RL information is set to a first mode (S36). When the memory system is set to the first mode, candidate RL information that is the most similar to the calculated optimal read level may be selected from among a plurality of pieces of candidate RL information according to embodiments described above (S37), and an index corresponding to the selected candidate RL information may be stored as the chip RL information (S38). On the other hand, when the memory system is set to a second mode, an entry that is the most different from the calculated optimal read level may be released from the candidate RL table (S39) such that many entries similar to the current optimal read level of blocks of a plurality of memory chips may be secured in the candidate RL table.

By releasing the entry, the newly calculated optimal read level may be added to the entries, and accordingly, operations S34 and S35 as described above may be performed.

Figure 15:
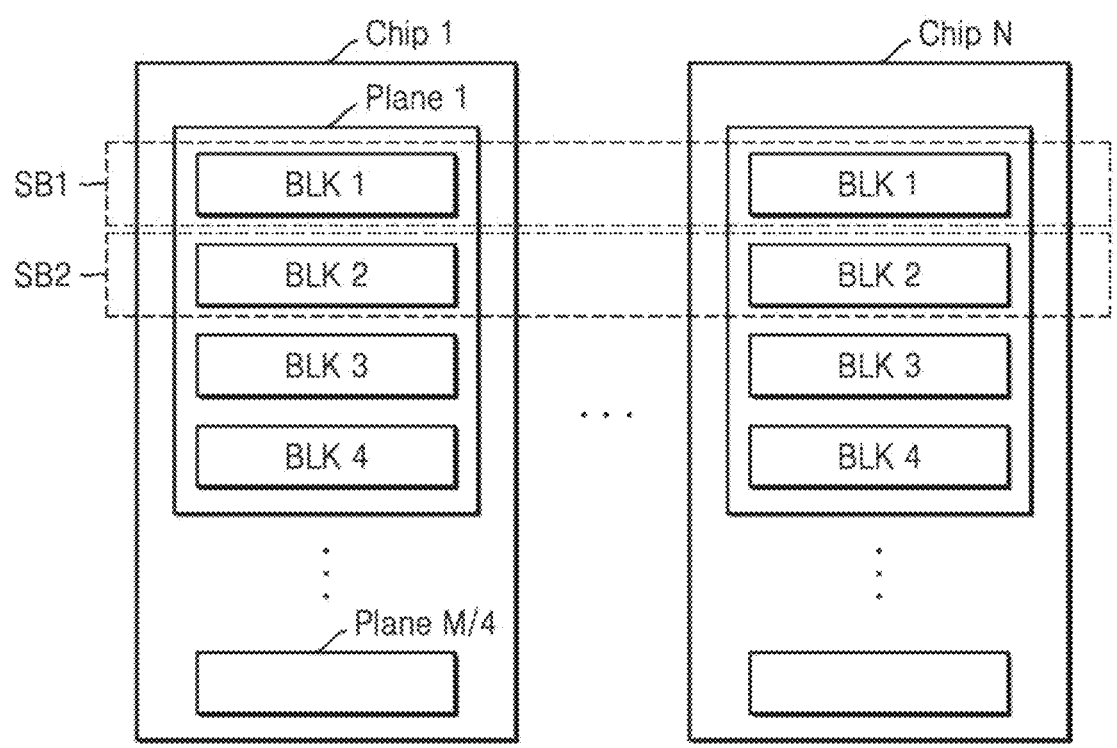

FIGS. 15 and 16 are diagrams illustrating a memory system according to various embodiments.

Referring to FIG. 15, a memory device may include a plurality of memory chips, including the first to Nth memory chips Chip 1 to Chip N, and each of the first to Nth memory chips Chip 1 to Chip N may include the first to Mth blocks BLK 1 to BLK M. At this time, two or more blocks in the same memory chip may be classified into one plane, and as shown in FIG. 15, four blocks constitute one plane. A plane may refer to various units, and, for example, may correspond to groups of blocks corresponding to memory operations in which operations, such as a write operation and a read operation, may be performed in parallel on blocks included in a plurality of planes. In addition, write data provided as a plurality of planes or read data provided from the plurality of planes may communicate with a memory controller in different time periods.

According to embodiments, super block RL information may be managed with respect to a super block including each of the first to Mth blocks BLK 1 to BLK M of the first to Nth memory chips Chip 1 to Chip N, and chip RL information may be managed with respect to each of the first to Nth memory chips Chip 1 to Chip N. In addition, when managing the chip RL information related to the first to Mth blocks BLK 1 to BLK M included in the first to Nth memory chips Chip 1 to Chip N, the chip RL information may be stored and updated in units of planes. That is, the same chip RL information may be set with respect to four blocks included in the same plane.

When one memory chip includes 2200 blocks, and one plane includes 4 blocks, 550 chip RL information may be managed with respect to the memory chip and stored or updated in a memory. When the index is managed as chip RL information and has a size of 1 byte, only a storage space with a size of 550 bytes is required to store the chip RL information in one memory chip, and accordingly, an increase in resources for storing the chip RL information may be minimized.

An example of storing and updating super block RL information and chip RL information will be described.

The first to fourth blocks BLK 1 to BLK 4 included in a first plane Plane 1 may be included in the first memory chip Chip 1, and the first to fourth blocks BLK 1 to BLK 4 of the first memory chip Chip 1 may belong to different super blocks. When the optimal read level is calculated with respect to the first block BLK 1 of the first memory chip Chip 1, super block RL information corresponding to the first super block SB1 may be updated according to the calculated optimal read level, and chip RL information corresponding to the first plane Plane 1 to which the first block BLK 1 of the first memory chip Chip 1 belongs may be updated in units of planes.

Thereafter, when a new optimal read level is calculated with respect to the second block BLK2 of the first memory chip Chip 1, super block RL information corresponding to the second super block SB2 including the second block BLK2 may be updated. At this time, because the second block BLK2 of the first memory chip Chip 1 is included in the first plane Plane 1, chip RL information corresponding to the first plane Plane 1 may be updated according to the optimal read level calculated with respect to the second block BLK2 of the first memory chip Chip 1. Thereafter, during a read process of the first block BLK1 of the first memory chip Chip 1, a read operation may be performed based on the super block RL information corresponding to the first super block SB1, and, when a data failure occurs, the read operation may be performed based on the chip RL information of the first plane Plane 1 corresponding to the optimal read level of the second block BLK2 of the first memory chip Chip 1.

As describe above, the first to fourth memory blocks BLK 1 to BLK 4 included in the same first plane Plane 1 are included in different super blocks, but embodiments are not necessarily limited thereto. For example, a super block may be defined in various ways, and, for example, blocks included in the same plane may constitute the same super block. For example, as a plane of each of the plurality of memory chips constitutes one super block, a plurality of blocks included in one memory chip may constitute the same super block.

Referring to FIG. 16, when storing the chip RL information, a plurality of pieces of chip RL information corresponding to the plurality of blocks may be stored with respect to each memory chip. In addition, at least two indexes may be stored as the chip RL information with respect to each block, and, in FIG. 16, two indexes are stored as the chip RL information with respect to a block of each memory chip. In addition, in an embodiment, as one plane may include a plurality of blocks, and the chip RL information is managed in units of each plane, two indexes may be stored as the chip RL information in correspondence to each plane. When each memory chip includes K planes, first to Kth indexes Index 1 to Index K may be stored as the chip RL information with respect to each memory chip.

Referring to the first block of the first memory chip Chip 1, the first index Index 1 may be stored as the chip RL information corresponding to the first block (or first plane including the first block) of the first memory chip Chip 1, and the first index Index 1 may include a first value Val 1 and a second value Val 2. For example, when the optimal read level is calculated with respect to the first block of the first memory chip Chip 1, an index having the two most similar values may be selected by comparing the calculated optimal read level with a plurality of pieces of candidate RL information.

In the reading process of the first block of the first memory chip Chip 1, when a failure occurs in data read based on the super block RL information, the read operation based on chip RL information may be performed. First, when the chip RL information is stored in the memory device, the memory controller may receive the first index Index 1 of the first value Val 1 and the second value Val 2 as the chip RL information with respect to the first block of the first memory chip Chip 1, and the read operation may be controlled based on candidate RL information in an RL information table corresponding to the index of each value. For example, the memory controller may control the read operation based on candidate RL information corresponding to the index of the first value Val 1, and when a failure occurs in data read through the read operation, may control the read operation based on candidate RL information corresponding to the index of the second value Val 2.

As described above, the memory controller or the memory device may store an index with a relatively small size as the chip RL information, and thus, even when two or more indexes are selected and managed as the chip RL information, an increase in resources may be minimized. In this case, even when a failure occurs in data read based on one candidate RL information, reading of data may be further attempted based on other candidate RL information, thereby reducing the possibility of data failure. In addition, when the chip RL information is managed in units of planes including a plurality of blocks, reading of data may be attempted through two or more candidate RL information set for each plane, and thus, despite management of the chip RL information in units of planes, a problem in which the possibility of data failure increases may be reduced or prevented.

Figure 17:
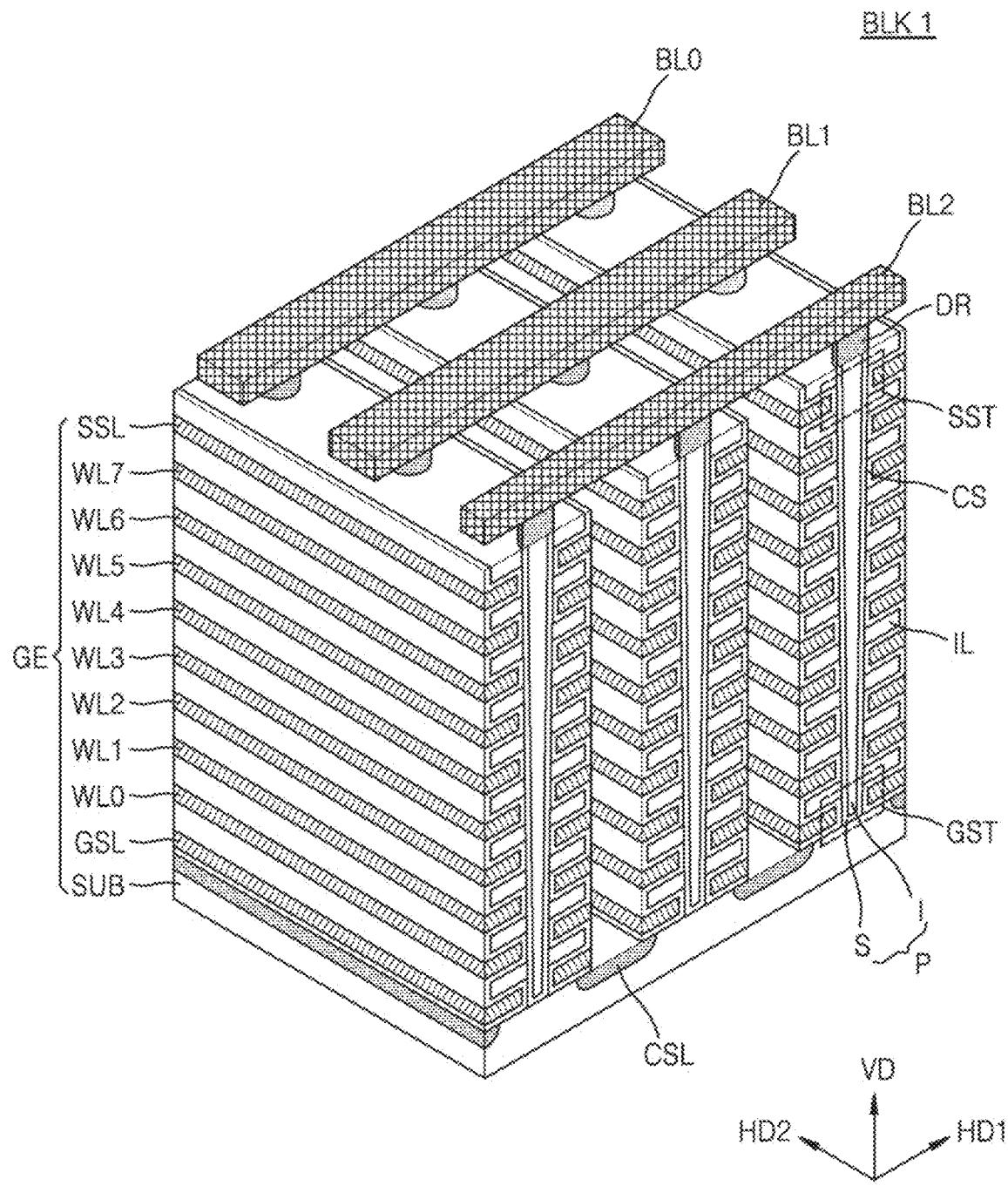
FIG. 17 is a perspective view illustrating a memory block according to an embodiment.

FIG. 17 is a perspective view illustrating the memory block BLK 1 according to an embodiment. The memory block BLK 1 of FIG. 17 may correspond to any one block included in a plurality of memory chips described in embodiments described above.

Referring to FIG. 17, the memory block BLK 1 is formed in a vertical direction VD with respect to a substrate SUB having a first conductivity type (e.g., p type). In an embodiment, a common source line CSL doped with impurities of a second conductivity type (e.g., n-type) may be provided to the substrate SUB. In an embodiment, the substrate SUB may be implemented with polysilicon, and the common source line CSL in a plate type may be disposed on the substrate SUB. On the substrate SUB, a plurality of insulating films IL extending in a second direction H2 are sequentially provided in the vertical direction VD, and are spaced apart by a certain distance in the vertical direction VD. For example, the plurality of insulating films IL may each include an insulating material such as silicon oxide.

A plurality of pillars P sequentially disposed in a first direction H1 and penetrating the plurality of insulating films IL in the vertical direction VD are provided on the v. For example, the plurality of pillars P may respectively penetrate the plurality of insulating films IL and contact the substrate SUB. Specifically, a surface layer S of each of the plurality of pillars P may include a silicon material of a first type and may function as a channel region. Accordingly, each of the plurality of pillars P may be referred to as a vertical channel structure. An inner layer I of each of the plurality of pillars P may include an insulating material such as silicon oxide or an air gap.

A charge storage layer CS is provided along the insulating films IL, the pillars P, and an exposed surface of the substrate SUB. The charge storage layer CS may include a gate insulating layer, a charge trap layer, and a blocking insulating layer. For example, the charge storage layer CS may have an oxide-nitride-oxide (ONO) structure. In addition, on an exposed surface of the charge storage layer CS, a gate electrode GE such as the ground select line GSL, the string select line SSL, and the word lines WL1 to WL8 are provided. Drains DR are provided on the plurality of pillars P. For example, the drains DR may each include a silicon material doped with impurities having a second conductivity type. Bit lines BL1 to BL3 extending in the first direction H1 and spaced apart by a specific distance in the second direction H2 are provided on the drains DR.

Figure 18:
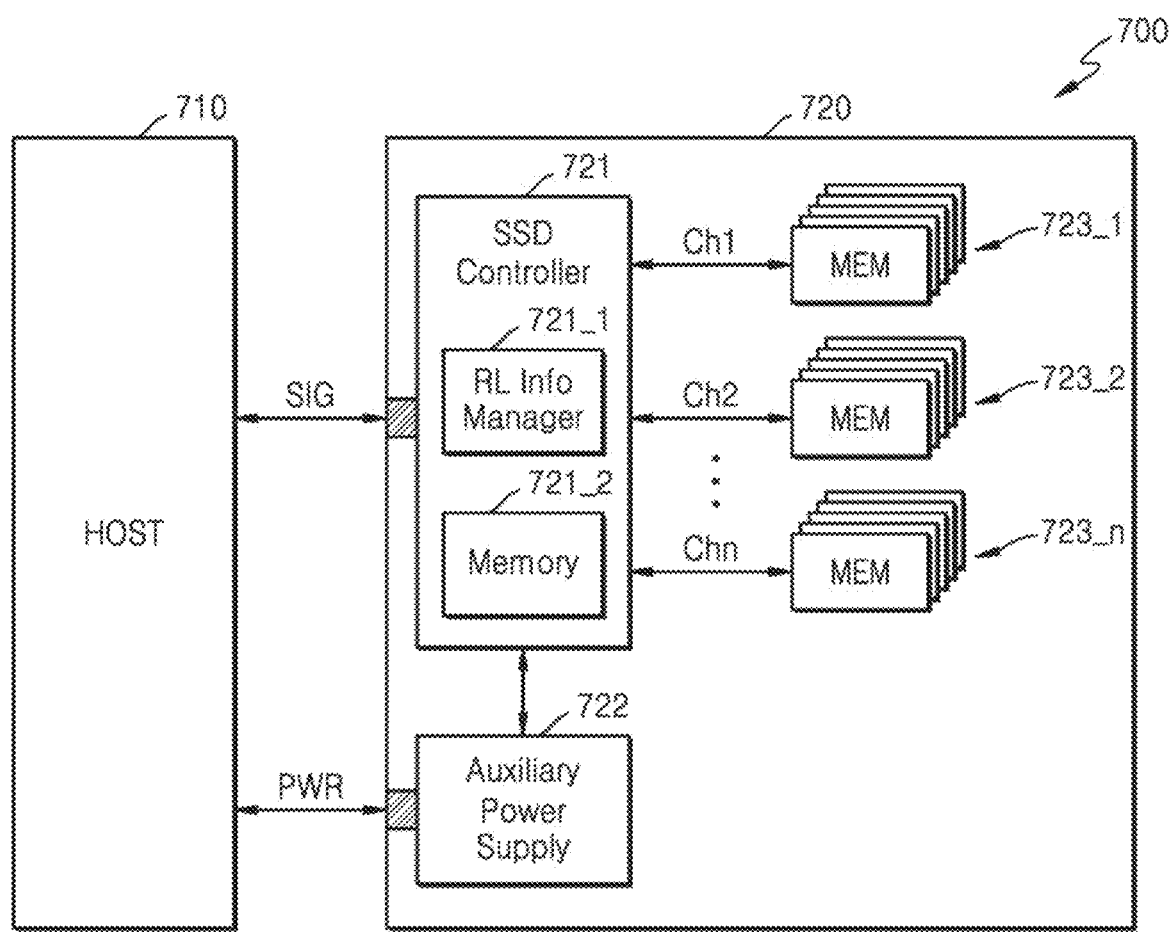
FIG. 18 is a block diagram illustrating a solid state drive (SSD) system according to some embodiments.

FIG. 18 is a block diagram illustrating an example of a solid state drive (SSD) system 700 to which a memory system according to some embodiments is applied.

Referring to FIG. 18, the SSD system 700 may include a host 710 and an SSD 720. The SSD 720 may exchange a signal SIG with the host 710 through a signal connector and may receive power PWR through a power connector. The SSD 720 may include an SSD controller 721, an auxiliary power supply 722, and non-volatile memories 723_1 to 723_n. The non-volatile memories 723_1 to 723_n may each include NAND flash memory, etc. At this time, the SSD 720 may be implemented using embodiments described above with reference to FIGS. 1 to 17.

For example, the SSD controller 721 provided in the SSD 720 may include an RL information manager 721_1 and a memory 721_2 according to embodiments, and the RL information manager 721_1 may store and mange super block RL information and chip RL information according to embodiments. In addition, the memory 721_2 may include a first memory storing the super block RL information and a second memory storing the chip RL information. Alternatively, according to embodiments, a candidate RL table may be stored in the non-volatile memories 723_1 to 723_n, and an index indicating the candidate RL information may be stored in the memory 721_2 as the chip RL information. Alternatively, according to embodiments, the chip RL information may be stored in each of the non-volatile memories 723_1 to 723_n.

In some embodiments, each of the components represented by a block as illustrated in FIGS. 1-4, 7, 10, 12 and 18 may be implemented as various numbers of hardware and/or firmware structures that execute respective functions described above, according to example embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may further include or may be implemented by a processor such as a central processing unit (CPU) that performs the respective functions, a microprocessor, or the like. Functional aspects of example embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of embodiments have been particularly shown and described, it will be understood that various changes in form and details may be made therein without departing from the spirit and scope of the following claims.

What is claimed is:

1. An operating method of a memory controller, wherein the memory controller is configured to control a read operation of a memory device comprising a plurality of memory chips, the plurality of memory chips comprising a first memory chip, the operating method comprising:
in a first super block comprising first blocks of the plurality of memory chips, calculating a first read level with respect to a first block of the first memory chip;
storing the first read level in a first memory as first super block read level (RL) information corresponding to the first super block;
storing the first read level in a second memory as first chip RL information corresponding to the first memory chip;
during the read operation on the first blocks included in the first super block, controlling the read operation based on the first super block RL information stored in the first memory; and
based on a failure occurring in data read from the first block of the first memory chip by using the first super block RL information, controlling the read operation on the first block of the first memory chip based on the first chip RL information stored in the second memory.

2. The operating method of claim 1, further comprising: based on more than a threshold number of errors occurring or an uncorrectable error occurring in the read data, identifying that a failure has occurred.

3. The operating method of claim 1, further comprising:
identifying a second read level with respect to the first block of a second memory chip;
updating the first super block RL information in the first memory based on the second read level; and
storing the second read level in the second memory as second chip RL information corresponding to the second memory chip.

4. The operating method of claim 3, further comprising during a read operation on the first blocks included in the first super block, controlling the read operation based on the first super block RL information that has been updated based on the second read level.

5. The operating method of claim 1, further comprising:
controlling the read operation on the first block of a second memory chip based on the first super block RL information; and
based on a failure not occurring in the data read from the first block of the second memory chip, storing the first read level in the second memory as second chip RL information corresponding to the second memory chip.

6. The operating method of claim 1, wherein each of the plurality of memory chips includes a plurality of blocks, and
wherein a plurality of pieces of chip RL information corresponding to the plurality of blocks are stored in the second memory with respect to each of the plurality of memory chips.

7. The operating method of claim 1, wherein the memory controller includes a candidate RL table storing a plurality of pieces of candidate RL information indicated by a plurality of indexes in relation to a read level of a block, and
   wherein an index corresponding to at least one candidate RL information having a value that is most similar to the first read level among the plurality of pieces of candidate RL information is stored in the second memory as the first chip RL information.

8. The operating method of claim 7, wherein the controlling the read operation using the first chip RL information comprises reading data based on the at least one candidate RL information corresponding to the index.

9. The operating method of claim 1, wherein the second memory includes a register in the memory device, and
   wherein the operating method further comprise providing the first chip RL information and an address indicating a storage position within the register to the memory device.

10. The operating method of claim 9, further comprising based on a failure occurring in data read from the first block of the first memory chip by using the first super block RL information, receiving the first chip RL information read from the register of the memory device.

11. A memory controller for communicating with a memory device comprising a plurality of memory chips, the memory controller comprising:
   a processor configured to control a read operation on the memory device;
   a read level (RL) information management circuit configured to, with respect to a first super block comprising first blocks of the plurality of memory chips, set a read level calculated with respect to at least one first block as first super block RL information corresponding to the first super block, and set a read level calculated with respect to the first blocks of the plurality of memory chips as chip RL information corresponding to the corresponding memory chip;
   a first memory configured to store a plurality of pieces of super block RL information respectively corresponding to a plurality of super blocks provided in the plurality of memory chips; and
   a second memory configured to store a plurality of chip RL information respectively corresponding to the plurality of memory chips,
   wherein, during a read operation on the memory device, the processor is further configured to control the read operation according to super block RL information read from the first memory, and, based on a failure occurring in data read based on the super block RL information, control the read operation according to chip RL information read from the second memory.

12. The memory controller of claim 11, wherein the first memory is further configured to store a first read level calculated with respect to the first block of a first memory chip as the first super block RL information, and the second memory is further configured to store the first read level as first chip RL information with respect to the first block of the first memory chip.

13. The memory controller of claim 12, wherein the processor is further configured to, based on a failure occurring in data read based on the first super block RL information with respect to the first block of a second memory chip, calculate a second read level with respect to the first block of the second memory chip, and
   wherein the RL information management circuit is further configured to update the first super block RL information based on the second read level, and store the second read level in the second memory as second chip RL information with respect to the first block of the second memory chip.

14. The memory controller of claim 12, wherein the RL information management circuit is further configured to, based on a failure not occurring in data read based on the first super block RL information with respect to the first block of a second memory chip, store the first read level in the second memory as second chip RL information with respect to the first block of the second memory chip.

15. The memory controller of claim 11, wherein the memory controller is further configured to store a candidate RL table comprising a plurality of pieces of candidate RL information indicated by a plurality of indexes in relation to a read level of a block, and
   wherein the RL information management circuit is further configured to store an index corresponding to at least one candidate RL information having a value that is most similar to a read level calculated with respect to each of the plurality of memory chips in the second memory as the chip RL information.

16. The memory controller of claim 15, wherein the processor is further configured to control a read operation using the chip RL information based on a read level according to the at least one candidate RL information corresponding to the index.

17. The memory controller of claim 15, wherein each of the plurality of memory chips comprises a plurality of blocks, and
   wherein the chip RL information of each of the plurality of memory chips comprises a plurality of indexes respectively corresponding to read levels calculated with respect to the plurality of blocks.

18. A memory system comprising:
   a memory device comprising a plurality of memory chips, each of the plurality of memory chips comprising a plurality of blocks, wherein first blocks of the plurality of memory chips constitute a first super block; and
   a memory controller configured to control a read operation on the memory device according to a request from a host,
   wherein the memory device is configured to:
      read data of a first block of a first memory chip according to first super block read level (RL) information that is commonly set for the first blocks of the first super block and indicates a first read level; and
      based on a failure occurring in the data read based on the first super block RL information, read the data of the first block of the first memory chip according to first chip RL information that is set separately with respect to the first memory chip and indicates a second read level different from the first read level.

19. The memory system of claim 18, wherein the memory controller comprises:
   a first memory configured to store a plurality of pieces of super block RL information with respect to a plurality of super blocks included in the plurality of memory chips, and
   a second memory configured to store chip RL information with respect to each of the plurality of memory chips.

20. The memory system of claim 19, wherein the memory controller is further configured to, based on a failure occurring in the data read from a first block of a second memory chip, calculate an optimal read level having a third read level with respect to the first block of the second memory chip, update the first super block RL information in the first memory based on the third read level, and store the third read level in the second memory as second chip RL information with respect to the first block of the second memory chip.

\* \* \* \* \*